(12) United States Patent
Hu et al.

(10) Patent No.: US 12,243,565 B2
(45) Date of Patent: Mar. 4, 2025

(54) DUAL FREE LAYER READ HEAD HAVING RECESSED SIDEWALL INSULATOR LAYER AND METHOD OF MAKING THEREOF

(71) Applicant: WESTERN DIGITAL TECHNOLOGIES, INC., San Jose, CA (US)

(72) Inventors: Chih-Ching Hu, Pleasanton, CA (US); Yung-Hung Wang, San Jose, CA (US); Ming Mao, Dublin, CA (US); Ming Jiang, San Jose, CA (US); Yukimasa Okada, Cupertino, CA (US); Goncalo Baiao de Albuquerque, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/233,800

(22) Filed: Aug. 14, 2023

(65) Prior Publication Data
US 2024/0404552 A1    Dec. 5, 2024

Related U.S. Application Data

(60) Provisional application No. 63/506,180, filed on Jun. 5, 2023.

(51) Int. Cl.
*G11B 5/39* (2006.01)
(52) U.S. Cl.
CPC .......... *G11B 5/3909* (2013.01); *G11B 5/3945* (2013.01)

(58) Field of Classification Search
None
See application file for complete search history.

(56) References Cited

U.S. PATENT DOCUMENTS

| | | | |
|---|---|---|---|
| 9,076,468 B1 * | 7/2015 | Keener | G11B 5/398 |
| 10,354,681 B1 | 7/2019 | Chien et al. | |
| 10,629,230 B2 | 4/2020 | Li et al. | |
| 10,755,733 B1 | 8/2020 | Zheng et al. | |
| 10,777,222 B1 * | 9/2020 | Liu | G11B 5/3912 |
| 10,991,390 B2 | 4/2021 | Kobayashi | |
| 11,087,785 B1 * | 8/2021 | Mao | G11B 5/3909 |
| 11,170,809 B1 * | 11/2021 | Mao | G11B 5/3909 |
| 11,410,690 B2 | 8/2022 | Hu et al. | |
| 11,514,935 B1 * | 11/2022 | Liu | G11B 5/11 |

(Continued)

*Primary Examiner* — William J Klimowicz
(74) *Attorney, Agent, or Firm* — PATTERSON + SHERIDAN, LLP

(57) ABSTRACT

A two-dimensional magnetic recording (TDMR) read head includes a lower reader and an upper reader. Each of the lower reader and the upper reader may have a dual free layer (DFL) magnetic tunnel junction structure having first and second free layers located between lower and upper shields. A synthetic antiferromagnetic (SAF) structure is located on a side of each magnetic tunnel junction. A sidewall insulating layer is located between the lower soft bias layer of the SAF structure and the first free layer. The sidewall insulating layer can have a reduced height such that an upper soft bias layer of the SAF structure is in direct contact with a sidewall of the second free layer, or the upper portion of the sidewall insulating layer located between the upper soft bias layer of the SAF structure and the sidewall of the second free layer has a reduced thickness.

17 Claims, 20 Drawing Sheets

(56) References Cited

U.S. PATENT DOCUMENTS

| | | | | |
|---|---|---|---|---|
| 2011/0051291 | A1* | 3/2011 | Miyauchi | G11B 5/3951 360/246.2 |
| 2015/0147481 | A1* | 5/2015 | Braganca | C25D 5/48 427/523 |
| 2021/0390978 | A1* | 12/2021 | Hu | G11B 5/3954 |
| 2024/0233762 | A1* | 7/2024 | Liu | G11B 5/3909 |

* cited by examiner

DUAL FREE LAYER READ HEAD HAVING RECESSED SIDEWALL INSULATOR LAYER AND METHOD OF MAKING THEREOF

FIELD

The present disclosure relates generally to the field of dual free layer (DFL) magnetic tunnel junction (MTJ) two-dimensional magnetic recording (TDMR) read heads, and specifically to a DFL MTJ TDMR read head with a recessed sidewall insulator and methods for forming the same.

BACKGROUND

Two-dimensional magnetic recording (TDMR) read heads have a first sensor, oftentimes referred to as a lower reader and a second sensor, oftentimes referred to as an upper reader. The readers each has lower and upper shields with an insulating reader separation gap (RSG) therebetween.

TDMR read heads typically have an MTJ structure with an antiferromagnetic layer, a synthetic antiferromagnetic pinned layer (SAF PL), an insulating barrier thereon, and a free magnetic layer. A capping layer may optionally be present on the free magnetic layer. The free magnetic layer is biased longitudinally from the side of the MTJ structure by a soft bias layer. Both the top reader and the bottom reader are substantially identical.

SUMMARY

According to an aspect of the present disclosure, a magnetic recording head comprises a first reader. The first reader comprises: a first lower shield; a first dual free layer (DFL) sensor located over the first lower shield and comprising a first free layer, a second free layer and a first barrier layer located between the first free layer and the second free layer; a first upper shield located over the first DFL sensor; a first synthetic antiferromagnetic (SAF) structure located adjacent to a first side of the first DFL sensor, the first SAF structure comprising a first lower soft bias layer, a first upper soft bias layer, and a first spacer layer located between the first lower soft bias layer and the first upper soft bias layer; and a first sidewall insulating layer comprising a first portion having a first thickness located between the first lower soft bias layer and the first free layer. The first upper soft bias layer is in direct contact with a first sidewall of the second free layer, or a second portion of the first sidewall insulating layer having a second thickness less than the first thickness is located between the first sidewall of the first upper soft bias layer and the second free layer.

According to another aspect of the present disclosure, a method of making a magnetic recording head comprises forming a first lower shield; forming a first dual free layer (DFL) sensor over the first lower shield, the first DFL sensor comprising a first free layer, a second free layer and a first barrier layer located between the first free layer and the second free layer; forming a sidewall insulating layer over a top and sidewalls of the first DFL sensor; forming a lower soft bias layer over the sidewall insulating layer; removing an upper portion of the lower soft bias located above a first plane located below a bottom surface of the second free layer to form a first lower soft bias layer; at least partially removing an upper portion of the sidewall insulating layer located above the first plane; forming a first spacer layer over the first lower soft bias layer; forming a first upper soft bias layer over the first spacer layer; and forming a first upper shield located over the first DFL sensor and over the first upper soft bias layer.

DETAILED DESCRIPTION

Figure 1A:
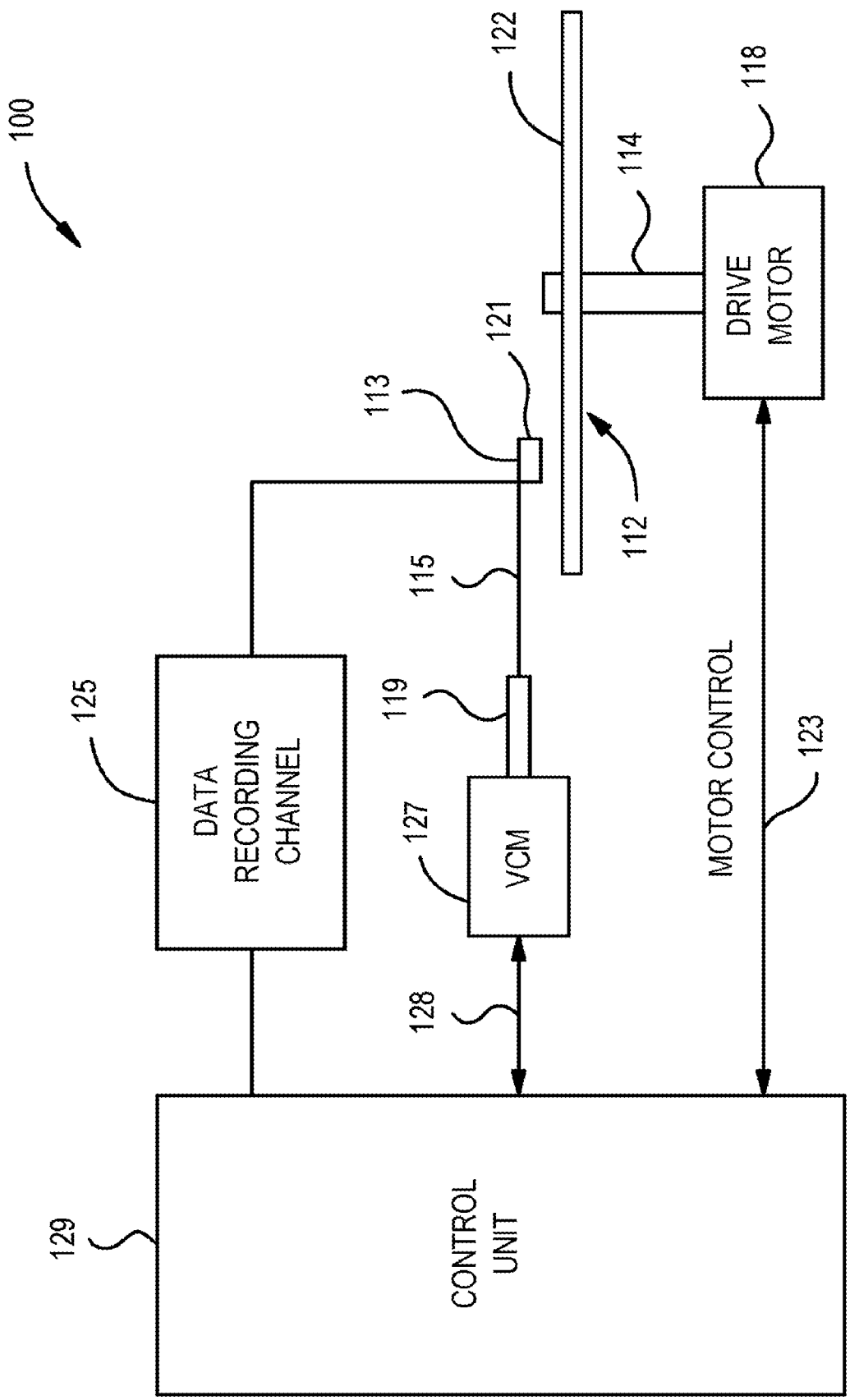
FIG. 1A is a schematic illustration of an exemplary magnetic media drive including a magnetic read head according to an embodiment of the present disclosure.

As discussed above, embodiments of the present disclosure are directed to a dual free layer (DFL) magnetic tunnel junction (MTJ) two-dimensional magnetic recording (TDMR) read head with a recessed sidewall insulator and methods for forming the same, the various aspects of which are described below.

The drawings are not drawn to scale. Multiple instances of an element may be duplicated where a single instance of the element is illustrated, unless absence of duplication of elements is expressly described or clearly indicated otherwise. Ordinals such as "first," "second," and "third" are employed merely to identify similar elements, and different ordinals may be employed across the specification and the claims of the instant disclosure. The term "at least one" element refers to all possibilities including the possibility of a single element and the possibility of multiple elements. The same reference numerals refer to the same element or similar element. Unless otherwise indicated, elements having the same reference numerals are presumed to have the same composition and the same function. A set of reference numerals provided within a parenthesis may refer to a structure including each of the elements represented by the reference numeral in case the reference numerals refer to different elements, or alternatively, may refer to the same element that is described employing different reference numerals in case the reference numerals refer to a same element or equivalent elements. Whether a set of reference numerals refer to a collection of different elements or a same element should be clear in the context of each appearance of such parentheses.

Unless otherwise indicated, a "contact" between elements refers to a direct contact between elements that provides an edge or a surface shared by the elements. If two or more elements are not in direct contact with each other or among one another, the two elements are "disjoined from" each other or "disjoined among" one another. As used herein, an element located "on" a second element can be located on the exterior side of a surface of the second element or on the interior side of the second element. As used herein, an element is located "directly on" a second element if there exist a physical contact between a surface of the element and a surface of the second element. As used herein, an element is "electrically connected to" a second element if there exists a conductive path consisting of at least one conductive material between the element and the second element. As used herein, a "prototype" structure or an "in-process" structure refers to a transient structure that is subsequently modified in the shape or composition of at least one component therein.

As used herein, a "layer" refers to a material portion including a region having a thickness. A layer may extend over the entirety of an underlying or overlying structure, or may have an extent less than the extent of an underlying or overlying structure. Further, a layer may be a region of a homogeneous or inhomogeneous continuous structure that has a thickness less than the thickness of the continuous structure. For example, a layer may be located between any pair of horizontal planes between, or at, a top surface and a bottom surface of the continuous structure. A layer may extend horizontally, vertically, and/or along a tapered surface. A substrate may be a layer, may include one or more layers therein, or may have one or more layer thereupon, thereabove, and/or therebelow.

The embodiments of the present disclosure are directed to a read head, such as a dual free layer (DFL) two-dimensional magnetic recording (TDMR) read head, with a recessed sidewall insulator. Recessing the sidewall insulator adjacent to a second free layer (FL2) reduces or eliminates lateral spacing between the second free layer and a top soft bias (SB2) layer. The reduction or elimination of lateral spacing increases the longitudinal bias of the second free layer, and thereby improves the bias balance between the bottom free layer (FL1) and the top free layer (FL2). The DFL TDMR read head of the embodiments of the present disclosure provides well-balanced longitudinal bias between the bottom free layer (FL1) and the top free layer (FL2), and thus, exhibits a smaller sidelobe and improved low frequency signal-to-noise ratio (LF SNR).

During manufacture, a sidewall insulating layer and a lower soft bias material are deposited over a layer stack including a first free layer (FL1), a barrier layer, a second free layer (FL2), and an optional capping layer. A tip mill process is performed to recess the lower soft bias material and additionally to remove portions of the sidewall insulating layer that protrude above the top surface of a remaining portion of the lower soft bias material that forms a lower soft bias structure (SB1). In one embodiment, one or both sidewalls of the second free layer (FL2) can be physically exposed by the tip mill process. A spacer and an upper soft bias material can be subsequently deposited such that upper soft bias material of the upper soft bias structure (SB2) directly contacts at least one sidewall of the second free layer (FL2). In another embodiment, the tip mill process reduces a thickness of the sidewall insulating layer between the second free layer (FL2) and the upper soft bias structure (SB1) relative to the thickness of the sidewall insulating layer between the first free layer (FL1) and the lower soft bias structure (SB1) without completely removing the sidewall insulating layer between the second free layer and the upper soft bias structure.

The sidewall insulating layer can be removed or thinned over all sidewalls of the second free layer (FL2) or only over one sidewall of the second free layer (FL2). Thus, one embodiment includes one-sided insulator coverage for the second free layer, while another embodiment includes no insulator coverage on both sides of the second free layer. Generally, the thickness of the sidewall insulating layer can be varied, with a thinner portion of the sidewall insulating layer resulting in a stronger longitudinal bias on the second free layer (FL2). The thinned or removed sidewall insulating layer at the second free layer sidewalls reduces sidelobes and improves low frequency signal-to-noise (LF-SNR) performance.

In one embodiment of the present disclosure, a rear hard bias (RHB) structure may be disposed behind the MTJ. In this embodiment, the two dimensional magnetic recording (TDMR) read head has a magnetic tunnel junction (MTJ). Both the upper reader and the lower reader have a dual free layer (DFL) MTJ structure between two shields A synthetic antiferromagnetic (SAF) soft bias (SB) structure bounds the MTJ, and the rear hard bias (RHB) structure is disposed behind the MTJ. In this embodiment DFL TDMR read head the antiferromagnetic (AFM) layer anchoring the pinned layer (PL) to the seed layer of each MTJ stack may be omitted, which may result in a thinner stack and a lower performance degradation of the MTJ Thus, in this embodiment, the dual free layer MTJ with SAF soft bias (SB) structures on the sides and a rear hard bias (RHB) structure there behind, decreases the distance between the upper and lower reader and hence, improves the area density capacity (ADC). Additionally, the SAF SB structures and the RHB structure cause the DFL MTJ to have a scissor state magnetic moment at the media facing surface (MFS), such as the air bearing surface (ABS).

Referring to FIG. 1A, an embodiment of a magnetic media drive 100 including a magnetic write head and a magnetic read head is illustrated. The magnetic media drive 100 may be a single drive/device or comprise multiple drives/devices. The magnetic media drive 100 includes a magnetic recording medium, such as one or more rotatable magnetic disk 112 supported on a spindle 114 and rotated by a drive motor 118. A single disk drive is illustrated in FIG. 1A. The magnetic recording on each magnetic disk 112 may be in the form of any suitable patterns of data tracks, such as annular patterns of concentric data tracks (not shown) on the magnetic disk 112.

At least one slider 113 is positioned near the magnetic disk 112. Each slider 113 supports a head assembly 121 including one or more read/write heads, such as a write head and a read head comprising a tunneling magnetoresistance (TMR) device. As the magnetic disk 112 rotates, the slider 113 moves radially in and out over the disk surface 122 so that the head assembly 121 may access different tracks of the magnetic disk 112 where desired data are written or read. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1A may be a voice coil motor (VCM). The VCM includes a coil movable within a fixed magnetic field, the direction and speed of the coil movements being controlled by the motor current signals supplied by control unit 129.

During operation of the magnetic media drive 100, the rotation of the magnetic disk 112 generates an air or gas bearing between the slider 113 and the disk surface 122 which exerts an upward force or lift on the slider 113. The air or gas bearing thus counter-balances the slight spring force of suspension 115 and supports slider 113 off and slightly above the disk surface 122 by a small, substantially constant spacing during normal operation.

The various components of the magnetic media drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from the head assembly 121 by way of recording channel 125. The magnetic media drive may further include a plurality of media, or disks, a plurality of actuators, and/or a plurality number of sliders.

Figure 1B:
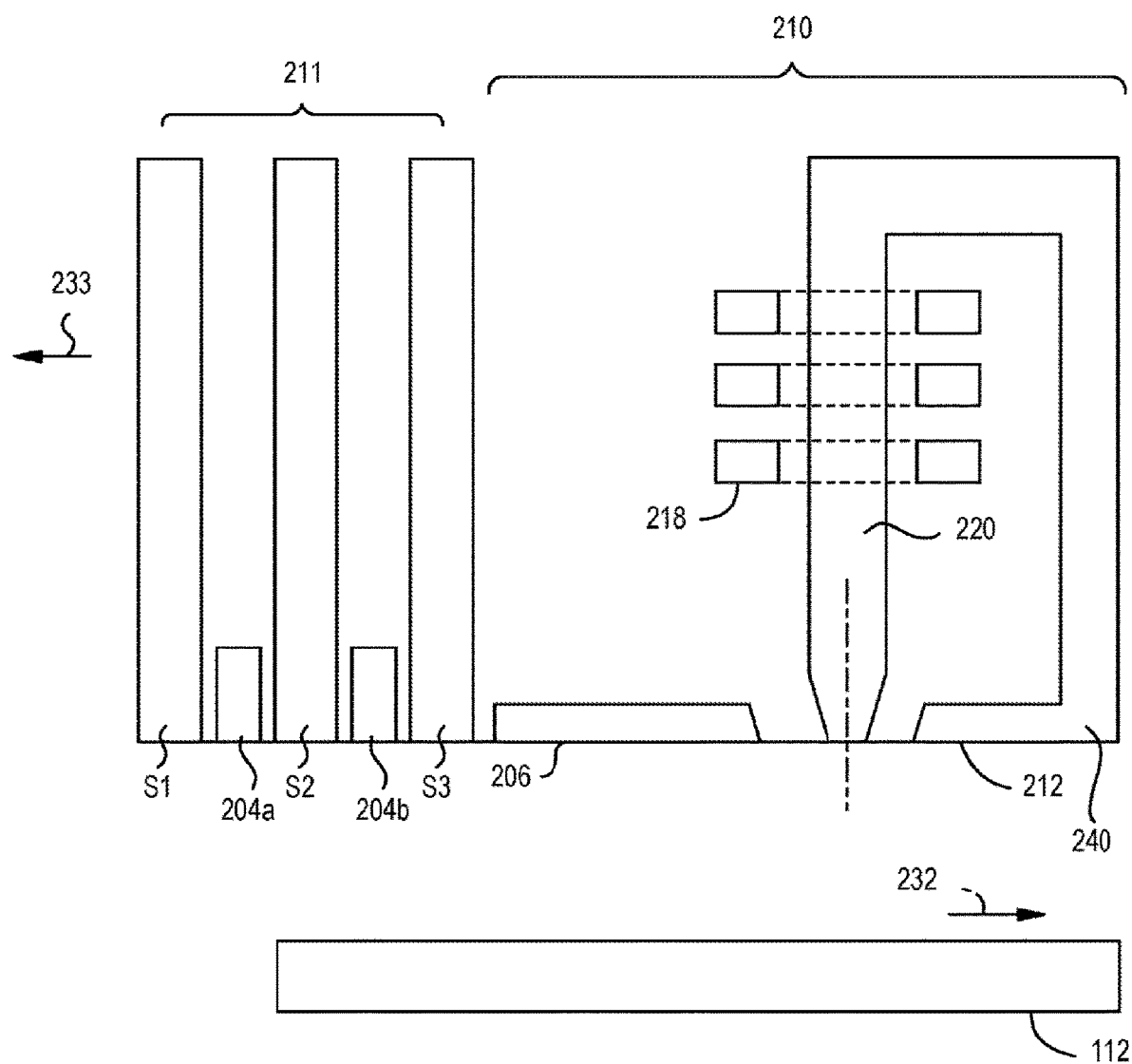
FIG. 1B is a schematic illustration of certain embodiments of a cross sectional side view of a head assembly facing a magnetic storage medium.

Referring to FIG. 1B, a cross sectional side view of a head assembly 200 facing the magnetic disk 112 or other magnetic storage medium is illustrated. The head assembly 200 may correspond to the head assembly 121 described in FIG. 1A. The head assembly 200 includes a media facing surface (MFS) 212 facing the magnetic disk 112. The magnetic disk 112 relatively moves in the direction indicated by the arrow 232 and the head assembly 200 relatively moves in the direction indicated by the arrow 233.

The head assembly 200 includes a magnetic read head 211. The magnetic read head 211 includes a first sensing element 204a located between shields S1 and S2, and a second sensing element 204b located between the shields S2 and S3. The sensing elements 204a, 204b and the shields S1, S2, and S3 all have surfaces at the MFS 212 facing the magnetic disk 112. The sensing elements 204a, 204b may be TMR devices sensing the magnetic fields of the recorded bits, such as perpendicular recorded bits or longitudinal recorded bits, in the magnetic disk 112 by a TMR effect. In certain embodiments, the spacing between shields S1 and S2 and the spacing between shields S2 and S3 is about 17 nm or less.

The head assembly 200 may include a write head 210. The write head 210 includes a main pole 220, a leading shield 206, and a trailing shield (TS) 240. The main pole 220 comprises a magnetic material and serves as a main electrode. Each of the main pole 220, the leading shield 206, and the trailing shield (TS) 240 has a front portion at the MFS 212. The write head 210 includes a coil 218 around the main pole 220 that excites the main pole 220 producing a writing magnetic field for affecting a magnetic recording medium of the rotatable magnetic disk 112. The coil 218 may be a helical structure or one or more sets of pancake structures. The trailing shield (TS) 240 comprises a magnetic material, serving as a return pole for the main pole 220. The leading shield 206 may provide electromagnetic shielding and is separated from the main pole 220 by a leading gap 254.

FIGS. 2A-2D are sequential vertical cross-sectional views of a first configuration of a reader during a manufacture process according to a first embodiment of the present disclosure.

Figure 2A:
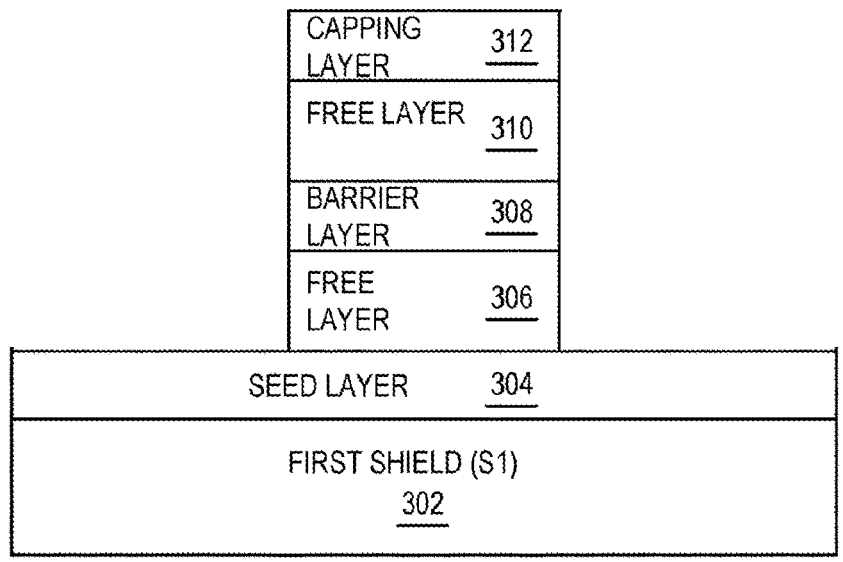
FIGS. 2A-2D are sequential vertical cross-sectional views of a first configuration of a reader during a manufacture process according to a first embodiment of the present disclosure.

Referring to FIG. 2A, an embodiment structure for formation of a reader having a first configuration is illustrated. The embodiment structure includes a first shield (S1) 302 and an optional seed layer 304. A sequence of a first ferromagnetic material layer, a barrier material layer, a second ferromagnetic material layer, and an optional capping layer can be deposited over the seed layer 304, and can be subsequently patterned, for example, by ion milling, to form a patterned layer stack including a first free layer (FL1) 306, a barrier layer 308 (which is also referred to as a tunneling dielectric layer), a second free layer (FL2) 310, and a capping layer 312. The patterned layer stack constitutes a dual free layer sensor (306, 308, 310, 312) that includes a first free layer 306 and a second free layer 310. The seed layer 304 may comprise a metal alloy, such as NiFe and/or CoHf, and the capping layer 312 may comprise a non-magnetic metal layer, such as tungsten and/or tantalum. The first and second free layers 306, 310 may comprise any suitable ferromagnetic free layers, such as CoFe or CoFeB alloys. The barrier layer 308 may comprise a dielectric layer, such as MgO.

Figure 2B:
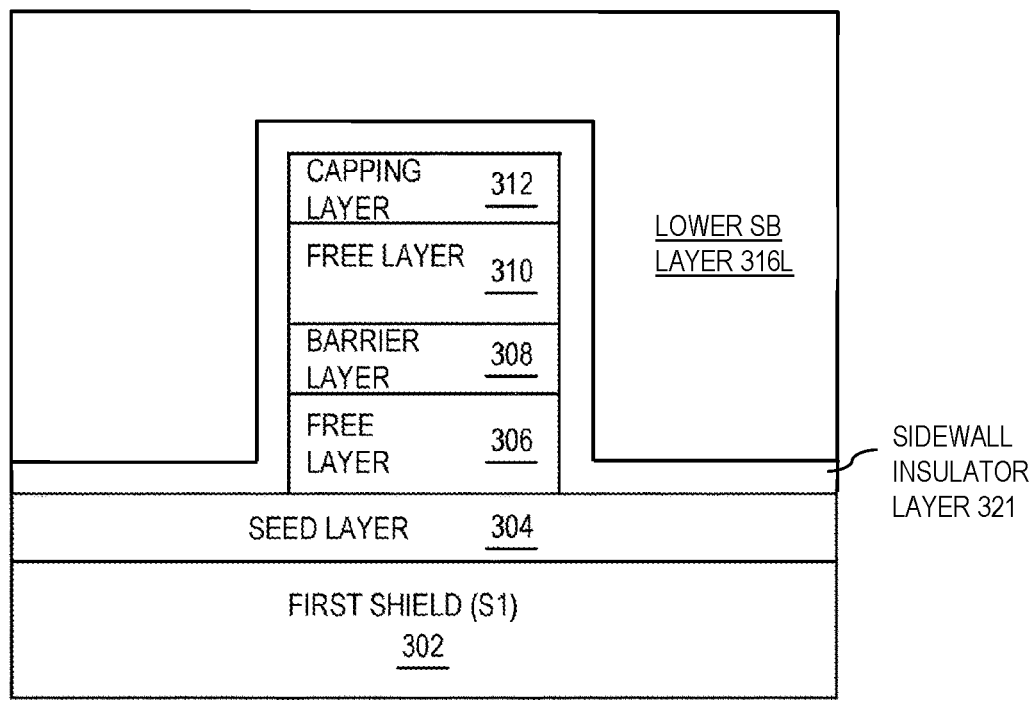

Referring to FIG. 2B, a sidewall insulating layer 321 can be deposited by performing a conformal deposition process, such as a chemical vapor deposition (CVD) process or an atomic layer deposition (ALD) process. The sidewall insulating layer 321 may comprise silicon oxide, silicon nitride, at least one dielectric metal oxide (such as aluminum oxide, magnesium oxide, hafnium oxide, tantalum oxide, titanium oxide, etc.), or a layer stack thereof. The thickness of the sidewall insulating layer 321 may be in a range from 2 nm to 20 nm, such as from 3 nm to 10 nm, although lesser and greater thicknesses may also be employed.

A lower soft bias (SB) layer 316L including a ferromagnetic soft bias material can be deposited over the sidewall insulating layer 321. The ferromagnetic soft bias material may comprise any suitable ferromagnetic material, such as NiFe, NiCo, CoFe or CoFeB. Optionally, the top surface of the lower soft bias (SB) layer 316L can be planarized, for example, by performing a chemical mechanical polishing or another planarization process. A planarized top surface of the lower soft bias (SB) layer 316L can be formed above the topmost surface of the sidewall insulating layer 321.

Figure 2C:
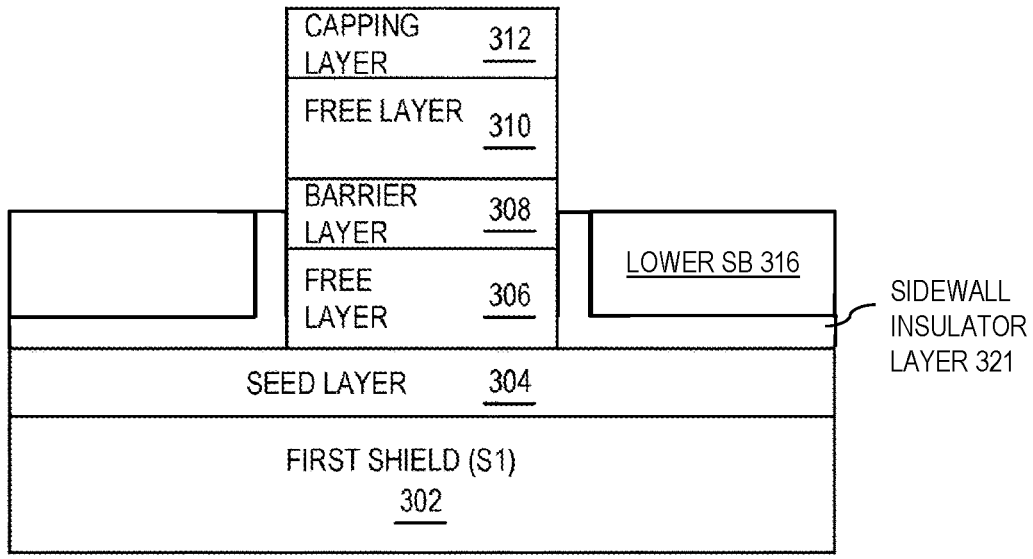

Referring to FIG. 2C, a tip mill process can be performed to remove portions of the lower soft bias (SB) layer 316L from above a horizontal plane located below a bottom surface of the second free layer 310, such as a horizontal plane located between the top surface of the barrier layer 308 and the bottom surface of the barrier layer 308. A tip mill process is a type of ion milling process in which an ion beam is focused within a small beam area that is typically less than 1 micron in diameter. The ion beam can be tilted at an angle relative to the vertical direction so that the material of the lower soft bias (SB) layer 316L is exposed to the ion beam while minimizing the exposure of the dual free layer sensor (306, 308, 310, 312) to the ion beam. According to a first embodiment of the present disclosure, the area that is irradiated with the ion beam is controlled such that the sidewall insulating layer 321 is removed from above the horizontal plane including a patterned remaining portion of the lower soft bias (SB) layer 316L, which constitutes a lower soft bias (SB) layer 316. The horizontal top surface of the lower soft bias (SB) layer 316 can be formed between a first horizontal plane including the bottom surface of the barrier layer 308 and a second horizontal plane including the top surface of the barrier layer 308.

Figure 2D:
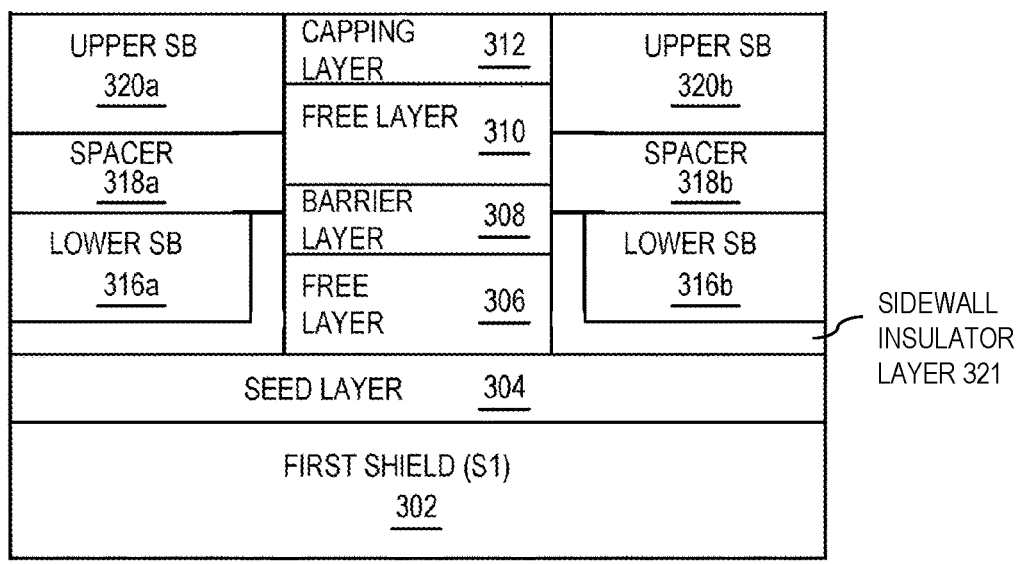

Referring to FIG. 2D, first and second spacers 318a, 318b including an antiferromagnetic coupling material, such as ruthenium, and a first and second upper soft bias (SB) layers 320a, 320b including a ferromagnetic soft bias material can be formed directly on respective first and second sides of the dual free layer sensor (306, 308, 310, 312). The ferromagnetic soft bias material may comprise any suitable ferromagnetic material, such as NiFe, NiCo, CoFe or CoFeB. The stack of the first lower soft bias (SB) layer 316a, the first spacer 318a, and the first upper soft bias (SB) layer 320a constitutes a first synthetic antiferromagnetic (SAF) soft bias (SB) structure that also functions as a first side shield. The stack of the second lower soft bias (SB) layer 316b, the second spacer 318b, and the second upper soft bias (SB) layer 320b constitutes a second SAF SB structure that also functions as a second side shield. The magnetic moments for the first free layer 306 and the second free layer 310 may be antiparallel due to the antiparallel biasing from the SAF SB structures. The top surface of the capping layer 312 may be coplanar with the top surfaces of the upper soft bias (SB) layers (320a, 320b).

Figure 2E:
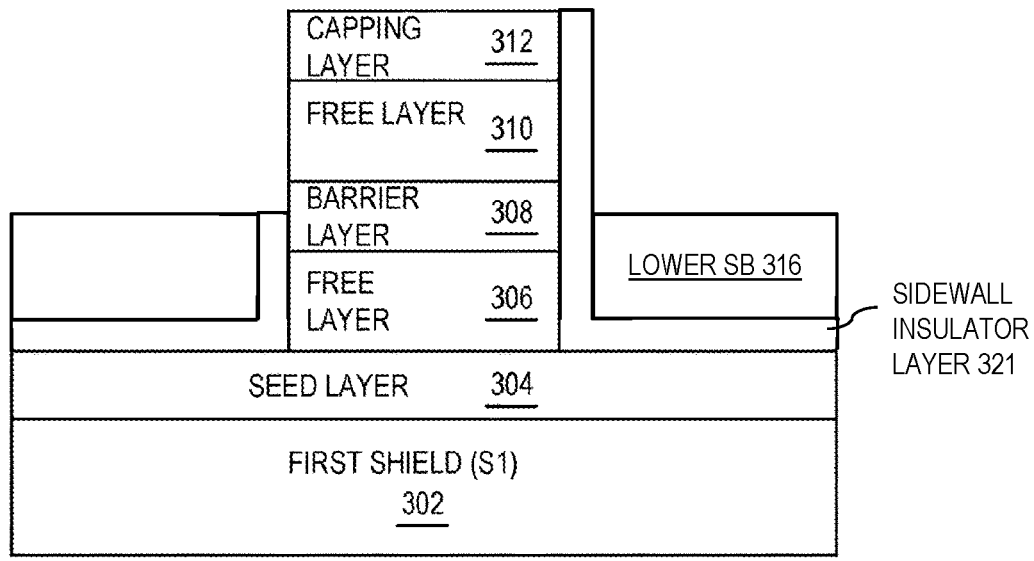
FIGS. 2E and 2F are sequential vertical cross-sectional views of a second configuration of a reader during a manufacture process according to a second embodiment of the present disclosure.
Figure 2F:
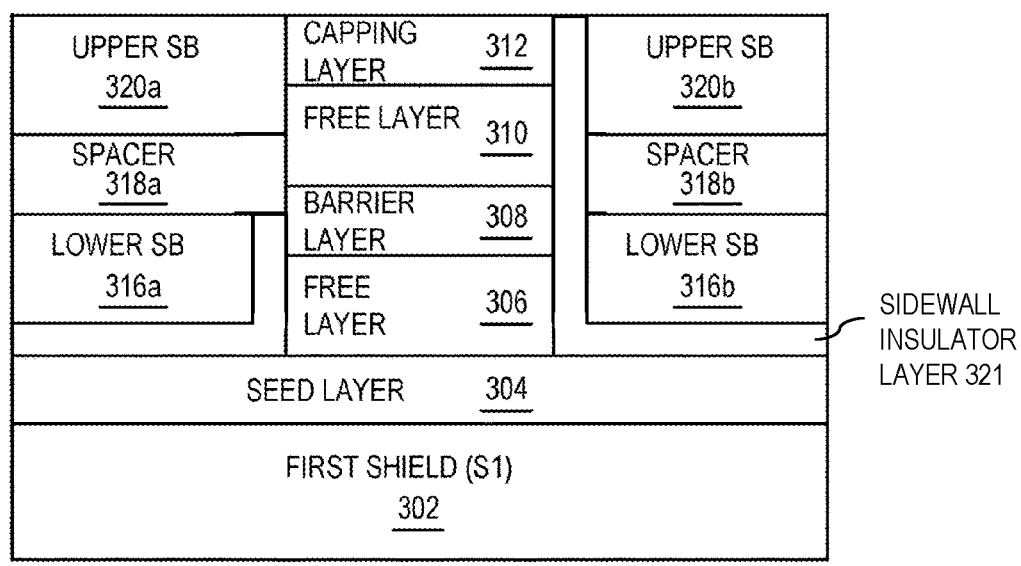

FIGS. 2E and 2F are sequential vertical cross-sectional views of a second configuration of a reader during a manufacture process according to a second embodiment of the present disclosure.

Referring to FIG. 2E, the second configuration of the reader can be derived from the first configuration of the reader as provided at the processing steps of FIG. 2B by modifying the tip mill process, Specifically, the sidewall insulating layer 321 is removed from above the horizontal plane including a patterned remaining portion of the lower soft bias (SB) layer 316L only from a first side of the dual free layer sensor (306, 308, 310, 312) and from above the top surface of the dual free layer sensor (306, 308, 310, 312), but is not removed from a second side of the dual free layer sensor (306, 308, 310, 312). The horizontal top surface of the lower soft bias (SB) layer 316 can be formed between a first horizontal plane including the bottom surface of the barrier layer 308 and a second horizontal plane including the top surface of the barrier layer 308. In one embodiment, a first vertically-extending portion of the sidewall insulating layer 321 may have a top surface above the first horizontal plane and below the second horizontal plane, and may be coplanar with the top surface of the horizontal top surface of the lower soft bias (SB) layer 316. A second vertically-extending portion of the sidewall insulating layer 321 may have a top surface that is coplanar with, or is substantially coplanar with, the top surface of the capping layer 312.

Referring to FIG. 2F, the processing steps described with reference to FIG. 2D can be performed. Specifically, the first and second spacers 318a, 318b including an antiferromagnetic coupling material such as ruthenium, and a first and second upper soft bias (SB) layers 320a, 320b including a ferromagnetic soft bias material can be formed over the respective first and second sides of the dual free layer sensor (306, 308, 310, 312). The first spacer 318a and the first upper soft bias layer 320a are formed directly on the first side of dual free layer sensor (306, 308, 310, 312) (e.g., on the first sidewalls of the second free layer 310 and the capping layer 312). The second spacer 318b and the second upper soft bias layer 320b are formed directly on an outer sidewall of the second vertically-extending portion of the sidewall insulating layer 321 which contacts the second sidewall of the dual free layer sensor (306, 308, 310, 312). The second spacer 318b and the second upper soft bias (SB) layer 320b can be laterally spaced from the second side of the dual free layer sensor (306, 308, 310, 312) by the second vertically-extending portion of the sidewall insulating layer 321.

Figure 2G:
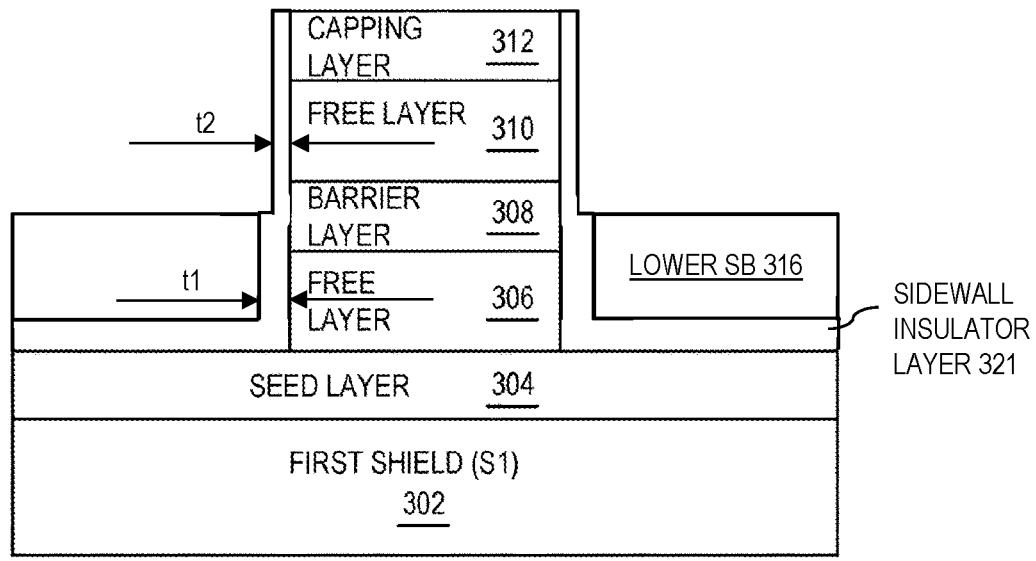
FIGS. 2G and 2H are sequential vertical cross-sectional views of a third configuration of a reader during a manufacture process according to a third embodiment of the present disclosure.
Figure 2H:
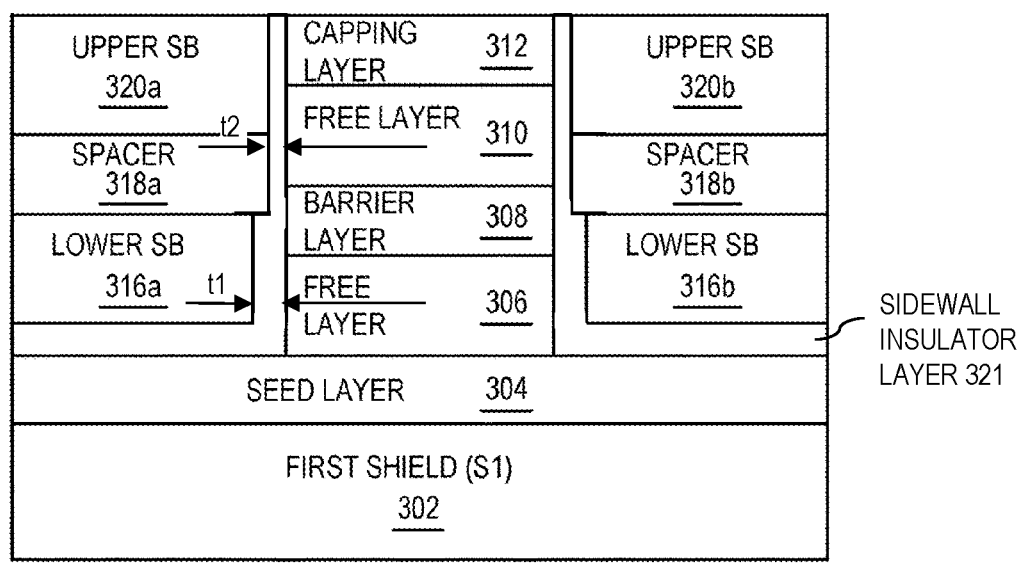

FIGS. 2G and 2H are sequential vertical cross-sectional views of a third configuration of a reader during a manufacture process according to third embodiment of the present disclosure.

Referring to FIG. 2G, the third configuration of the reader can be derived from the first configuration of the reader as provided at the processing steps of FIG. 2B by modifying the tip mill process. Specifically, the sidewall insulating layer 321 is removed from above the top surface of the dual free layer sensor (306, 308, 310, 312). The sidewall insulating layer 321 is thinned (i.e., partially removed), but is not completely removed, from sidewalls of the dual free layer sensor (306, 308, 310, 312) above the horizontal plane including a patterned remaining portion of the lower soft bias (SB) layer 316L. The thickness of the unthinned portions of the sidewall insulating layer 312 located below the barrier layer 308 is herein referred to as a first thickness t1, and the thickness of the thinned portions of the sidewall insulating layer 312 located above the barrier layer 308 is herein referred to as a second thickness t2. The second thickness t2 may be in a range from 10% to 90%, such as from 20% to 80%, of the first thickness t1. The horizontal top surface of the lower soft bias (SB) layer 316 can be formed between a first horizontal plane including the bottom surface of the barrier layer 308 and a second horizontal plane including the top surface of the barrier layer 308. In one embodiment, the vertically-extending portions of the sidewall insulating layer 321 may have a top surface at or about the top surface of the dual free layer sensor (306, 308, 310, 312). In one embodiment, the first sidewall insulating layer 321 has the first thickness t1 below a horizontal plane including a top surface of the lower soft bias layer 316, and has the second thickness t2 above the horizontal plane.

Referring to FIG. 2H, the processing steps described with reference to FIG. 2D can be performed. Specifically, the first and second spacers 318a, 318b, and the first and second upper soft bias (SB) layers 320a, 320b are formed over the respective first and second sides of the dual free layer sensor (306, 308, 310, 312). The first spacer 318a and the first upper soft bias (SB) layer 320a are laterally spaced from the first side of the dual free layer sensor (306, 308, 310, 312) by a first thinned vertically-extending portion of the sidewall insulating layer 321. The second spacer 318b and the second upper soft bias (SB) layer 320b are laterally spaced from the second side of the dual free layer sensor (306, 308, 310, 312) by a second thinned vertically-extending portion of the sidewall insulating layer 321.

Figure 3A:
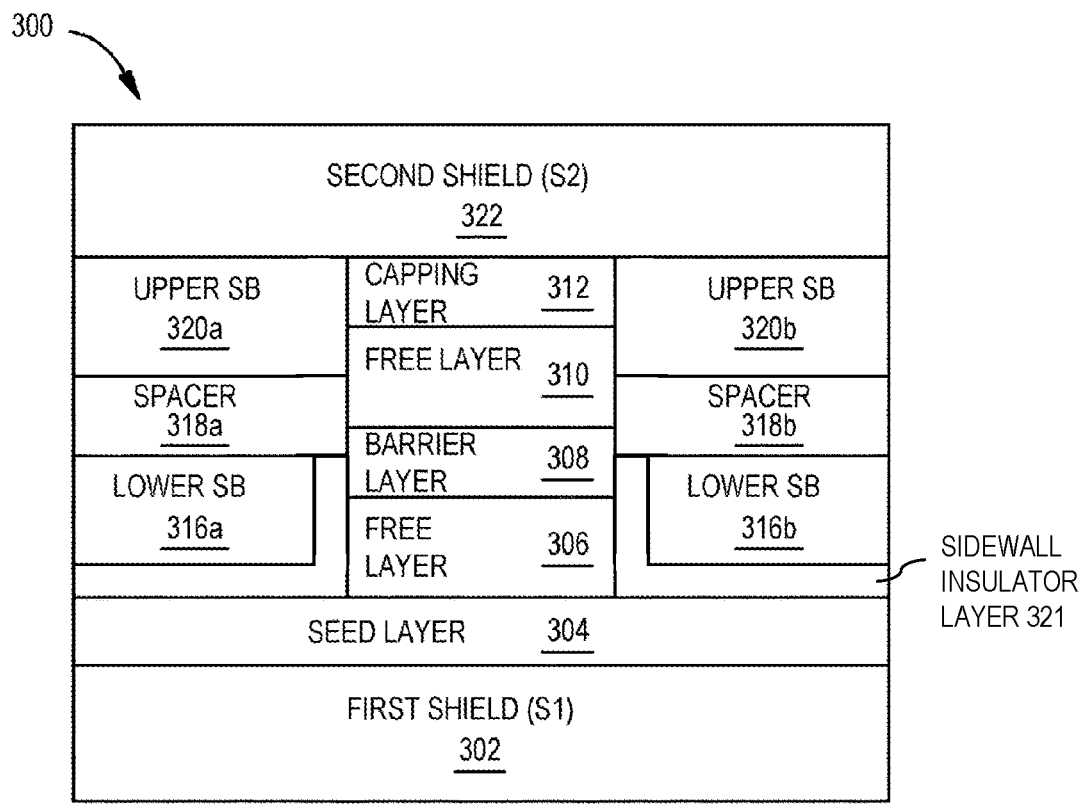
FIGS. 3A-3F are schematic cross-sectional views of a dual free layer (DFL) read head according to embodiments of the present disclosure.

FIGS. 3A-3F are schematic illustrations of a DFL read head 300. FIG. 3A is an ABS view of the read head 300 in the first configuration, i.e., in the first embodiment configuration illustrated in FIG. 2D. The read head 300 includes a first shield (S1) 302, a seed layer 304, a first free layer (FL) 306, a barrier layer 308, a second free layer 310, a capping layer 312, and a second shield (S2) 322. The seed layer 304 includes a material selected from the group that includes NiFe, CoHf and combinations thereof. In one embodiment, the barrier layer 308 comprises MgO. The read head 300 further includes a first synthetic antiferromagnetic (SAF) soft bias (SB) structure (e.g., a side shield) that includes a first lower soft bias (SB) layer 316a, a first spacer 318a such as ruthenium, and a first upper soft bias (SB) layer 320a and a second SAF SB structure that includes a second lower soft bias (SB) layer 316b, a second spacer 318b such as ruthenium, and a second upper soft bias (SB) layer 320b. The magnetic moments for the first free layer 306 and the second free layer 310 may be antiparallel due to the antiparallel biasing from the SAF SB structure.

Figure 3B:
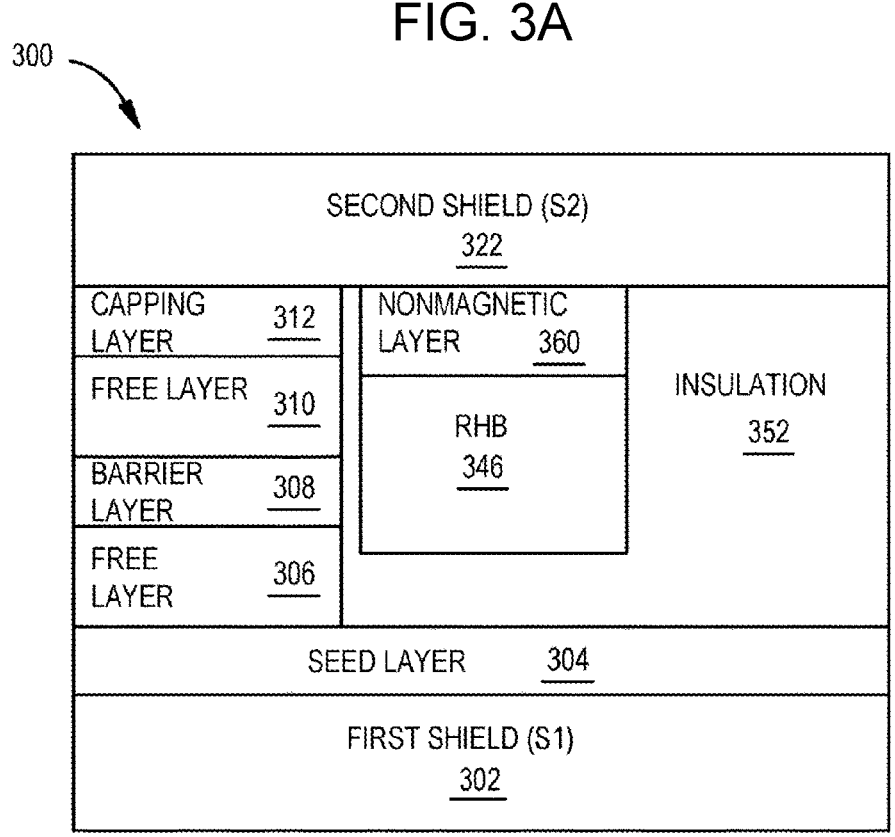

FIG. 3B is an APEX view of the read head 300. The read head 300 further includes a rear hard bias (RHB) 346 and an insulation 352. The insulation 352 may be aluminum oxide (AlOx) or any other suitable insulating material. The RHB 346 generates a magnetic field pointing away from the insulation 352 and towards the following layers: the first free layer 306, the barrier layer 308, the second free layer 310, and the capping layer 312. The RHB 346 may include cobalt platinum (CoPt), and it is magnetically decoupled with shield 322 by inserting a nonmagnetic layer 360 between 346 and 322.

Figure 3C:
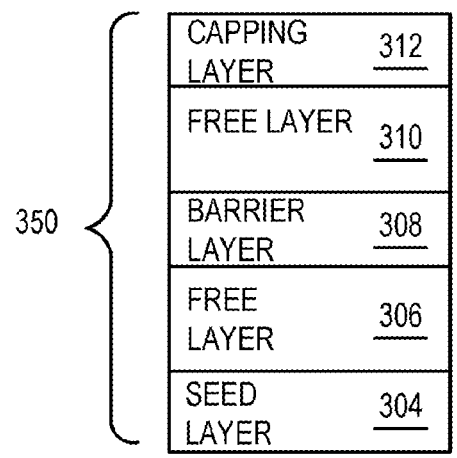

FIG. 3C is a schematic illustration of a magnetic tunnel junction (MTJ) stack 350 of the read head 300, according to one embodiment. The MTJ stack 350 includes the seed layer 304, the first free layer 306, the barrier layer 308, the second free layer 310, and the capping layer 312.

Figure 3D:
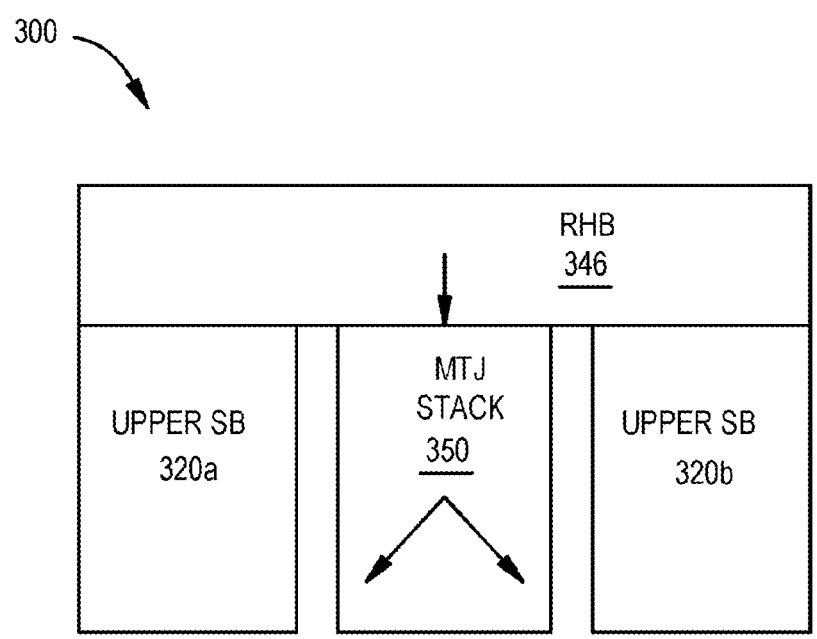

FIG. 3D is a top view of the read head 300 showing the response of the MTJ stack 350 to an external magnetic field. The RHB 346 generates a magnetic field pointing towards the MTJ stack 350. The RHB 346 is formed behind the MTJ stack 350. The magnetic moments of the first free layer 306 and the second free layer 310 are tilted towards each SB. The resulting magnetic moments may be referred to as a "scissor" state.

Figure 3E:
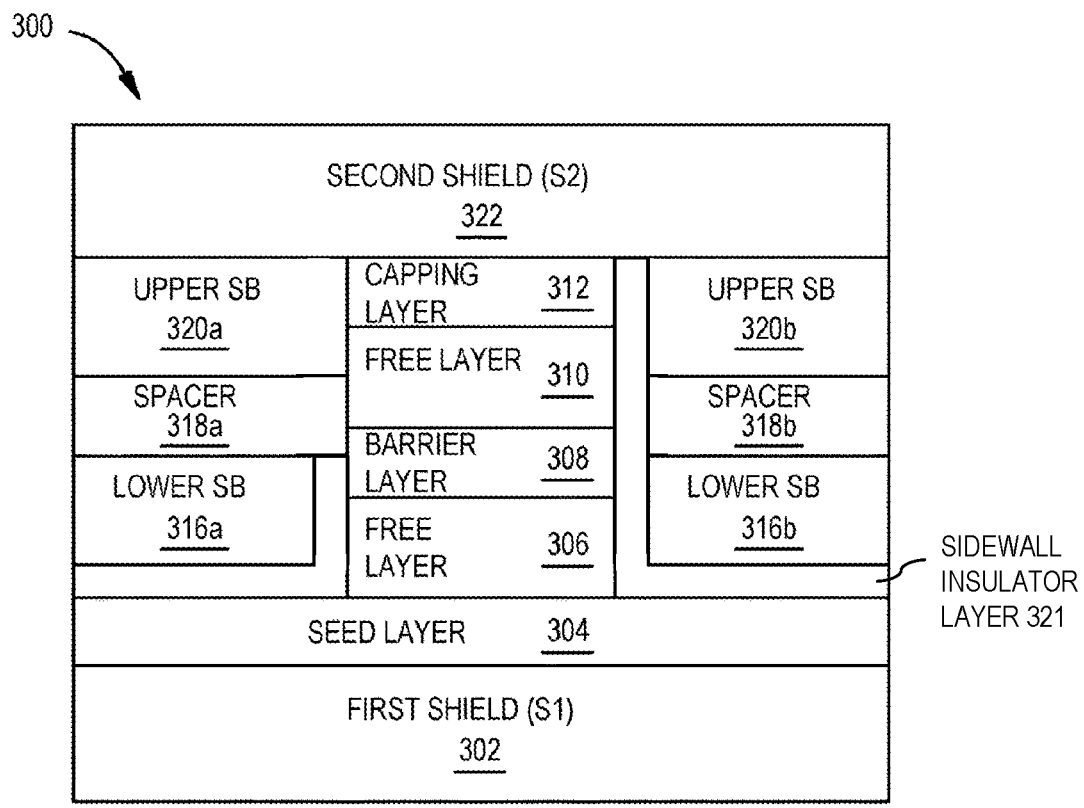

FIG. 3E is an ABS view of the read head 300 in the second configuration, i.e., in the second embodiment configuration illustrated in FIG. 2F.

Figure 3F:
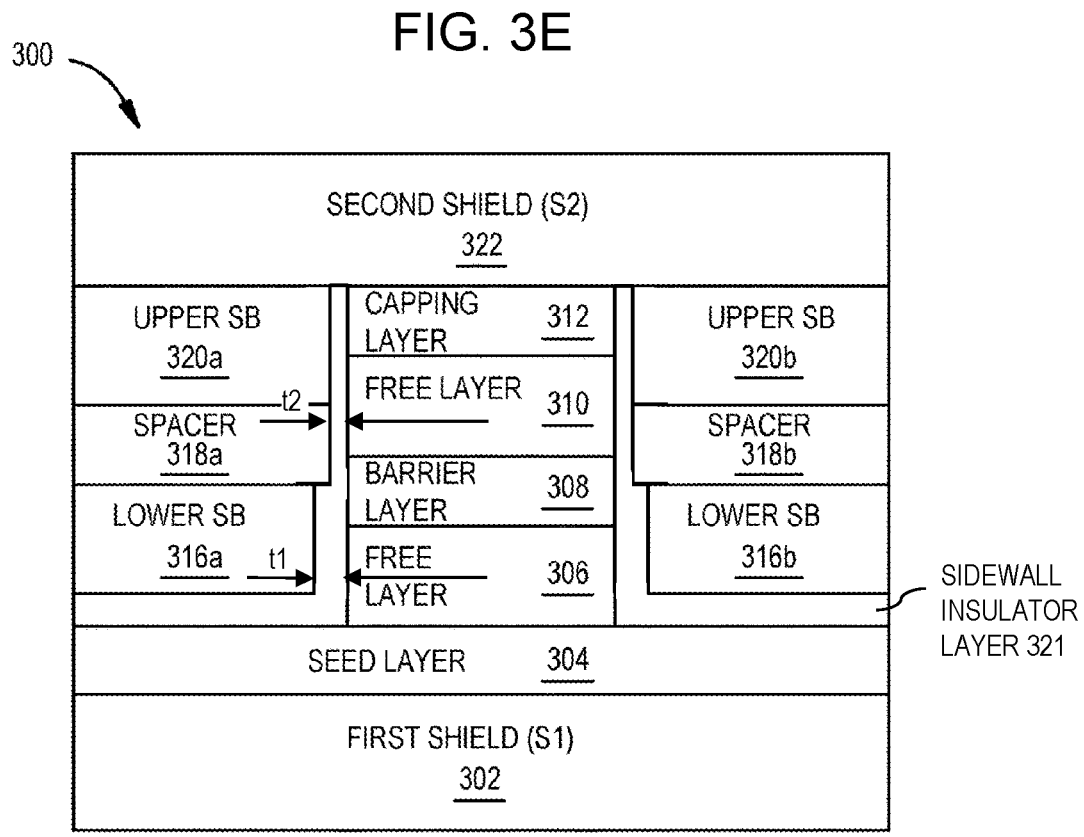

FIG. 3F is an ABS view of the read head 300 in the third configuration, i.e., in the third embodiment configuration illustrated in FIG. 2H.

Figure 4A:
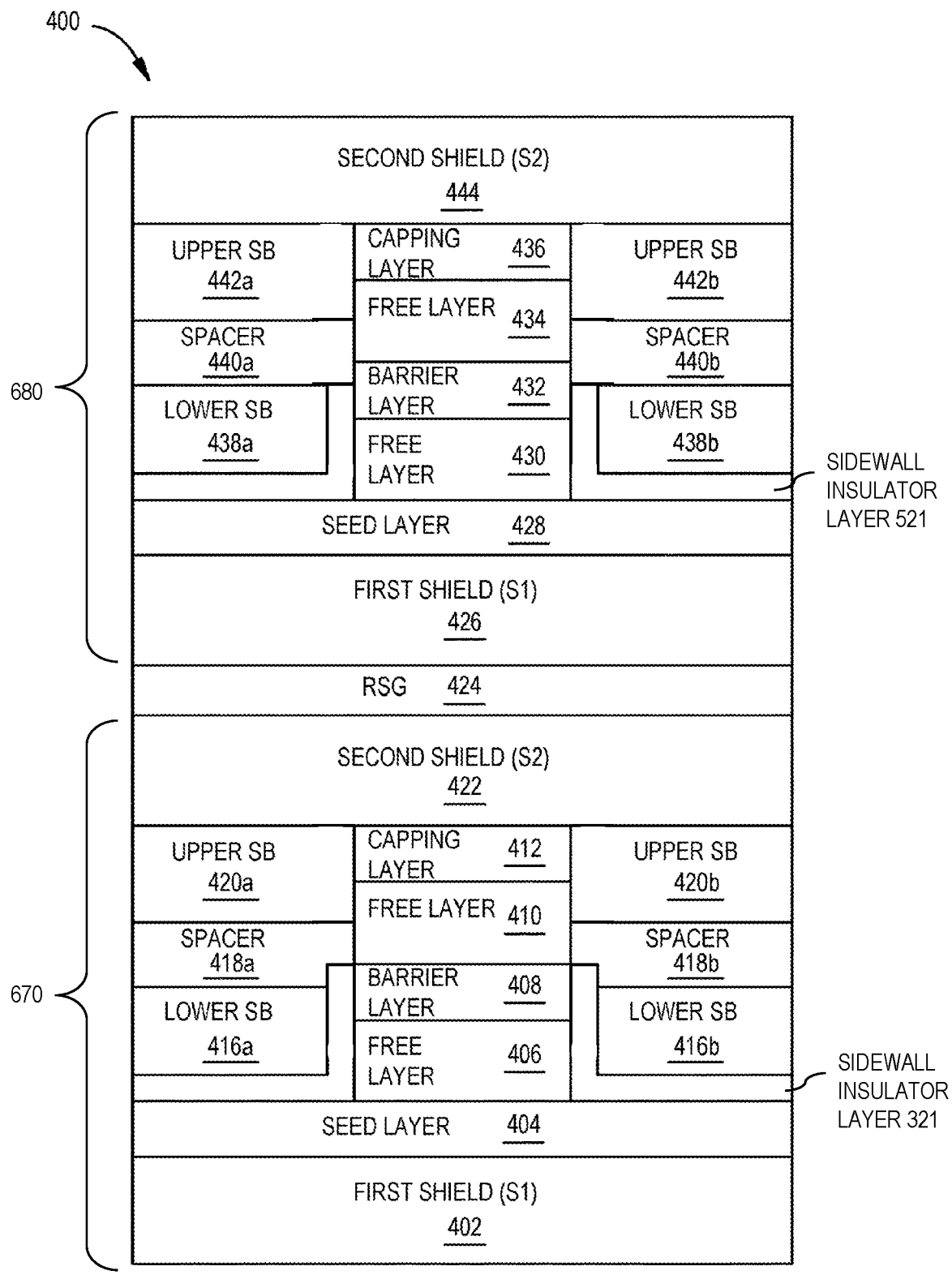
FIGS. 4A-4C are schematic cross-sectional views of a TDMR read head according to embodiments of the present disclosure.
Figure 4B:
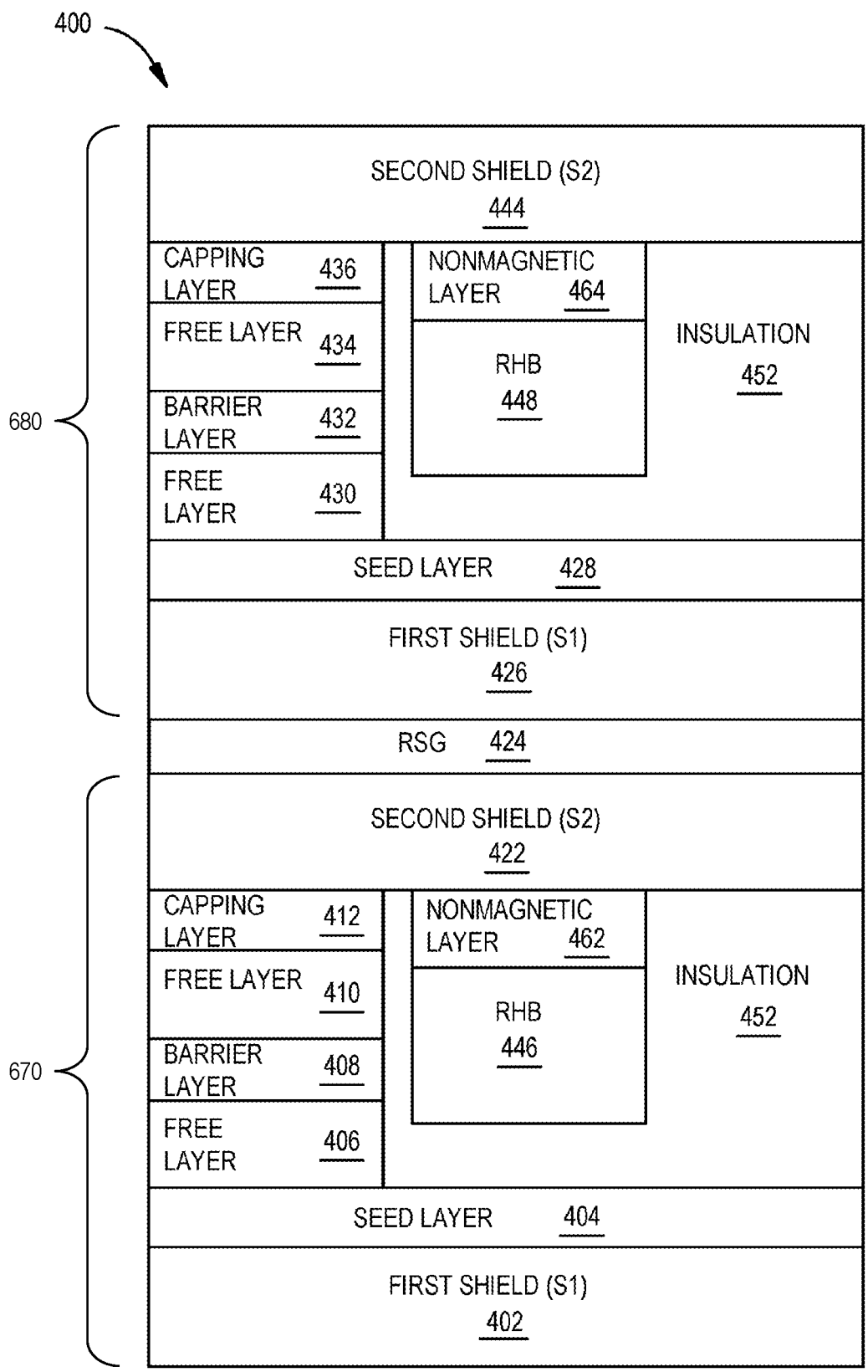
Figure 4C:
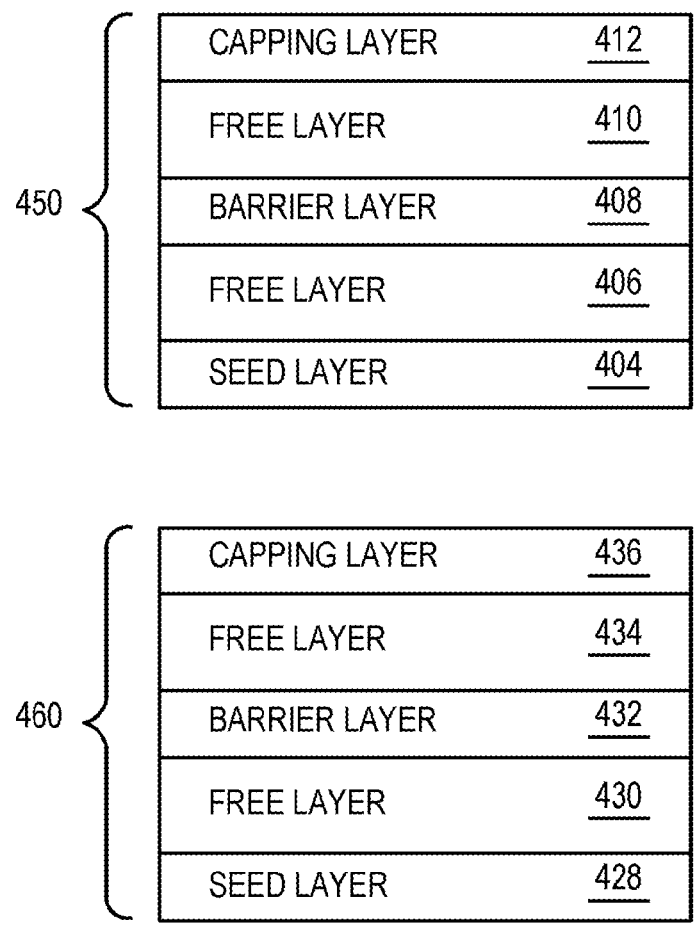

FIGS. 4A-4C are schematic illustrations of a TDMR read head 400 according to one embodiment. While the first and second readers 670, 680 in FIGS. 4A-4C have the first configuration of the read head (i.e., reader) 300 of the first embodiment illustrated in FIG. 3A, the readers 670, 680 of the TDMR read head 400 illustrated in FIGS. 4A-4C may be constructed with the second configuration of the read head 300 of the second embodiment illustrated in FIG. 3E, or the third configuration of the read head 300 of the third embodiment illustrated in FIG. 3F.

Generally, each of the first read head 670 and the second read head 680 may be independently selected from any of the first, second, and third configurations of the reader illustrated in FIGS. 3A, 3E, and 3F. Thus, a total of nine configurations for the TDMR read head 400 is contemplated. Specifically, the first read head 670 may have any of the three configurations described with reference to FIGS. 3A, 3E, and 3F, and the second read head 680 may have any of the three configurations described with reference to FIGS. 3A, 3E, and 3F.

FIG. 4A is an ABS view of a TDMR read head 400, according to one embodiment. The TDMR read head 400 includes a first reader that includes first shield (S1) 402, a seed layer 404, a first free layer (FL) 406, a barrier layer 408, a second free layer 410, a capping layer 412, and a second shield (S2) 422. The seed layer 404 includes a material selected from the group that includes NiFe, CoHf and combinations thereof. The barrier layer 408 includes an insulating material such as MgO. The first reader further includes a first SAF SB structure that includes a first lower soft bias (SB) layer 416a, a first spacer 418a comprising a material such as ruthenium, and a first upper soft bias (SB) layer 420a and a second SAF SB structure that includes a second lower soft bias (SB) layer 416b, a second spacer 418b comprising a material such as ruthenium, and a second upper soft bias (SB) layer 420b. The magnetic moments for the first free layer 406 and the second free layer 410 may be antiparallel due to the antiparallel biasing from the SAF SB structure.

An insulating reader separation gap (RSG) 424 separates the first reader and the second reader. The insulating RSG 424 may comprise aluminum oxide or any other suitable insulating material.

The TDMR read head 400 further includes a second reader that includes a first shield (S1) 426, a seed layer 428, a first free layer (FL) 430, a barrier layer 432, a second free layer 434, a capping layer 436, and a second shield (S2) 444. The seed layer 428 includes a material selected from the group that includes NiFe, CoHf and combinations thereof. In one embodiment, the barrier layer 432 comprises MgO. The second reader further includes a first SAF SB structure that includes a first lower soft bias (SB) layer 438a, a first spacer 440a comprising a material such as ruthenium, and a first upper soft bias (SB) layer 442a and a second SAF SB structure that includes a second lower soft bias (SB) layer 438b, a second spacer 440b comprising a material such as ruthenium, and a second upper soft bias (SB) layer 442b. The magnetic moments for the first free layer 430 and the second free layer 434 may be antiparallel due to the antiparallel biasing from the SAF SB structure.

FIG. 4B is an APEX view of a TDMR read head 400, according to another embodiment. The first reader further includes a rear hard bias (RHB) 446 behind the MTJ stack 450 and an insulation 452. The insulation 452 may be aluminum oxide (AlOx) or any other suitable insulating material. The RHB 446 generates a magnetic field pointing away from the insulation 452 and towards the following layers: the first free layer 406, the barrier layer 408, the second free layer 410, and the capping layer 412. The RHB 446 may include cobalt platinum (CoPt) located on a tantalum and/or tungsten seed layer, and is magnetically decoupled with second shield 422 by inserting a nonmagnetic layer 462 between the RHB 446 and the second shield 422.

The second reader further includes a rear hard bias (RHB) 448 behind the MTJ stack 460 and an insulation 452. The insulation 452 may be aluminum oxide (AlOx) or any other suitable insulation material. The RHB 448 generates a magnetic field pointing away from the insulation 452 and towards the following layers: the first free layer 430, the barrier layer 432, the second free layer 434, and the capping layer 436. The RHB 448 may include cobalt platinum (CoPt) located on a tantalum and/or tungsten seed layer, and is magnetically decoupled with second shield 444 by inserting a nonmagnetic layer 464 between the RHB 448 and the second shield 444.

FIG. 4C is a schematic illustration of a magnetic tunnel junction (MTJ) stack 450 of the TDMR read head 400, according to various embodiments. The first MTJ stack 450 of the first reader includes the seed layer 404, the first free layer 406, the barrier layer 408, the second free layer 410, and the capping layer 412. The second MTJ stack 460 of the second reader includes the seed layer 428, the first free layer 430, the barrier layer 432, the second free layer 434, and the capping layer 436.

Figure 5:
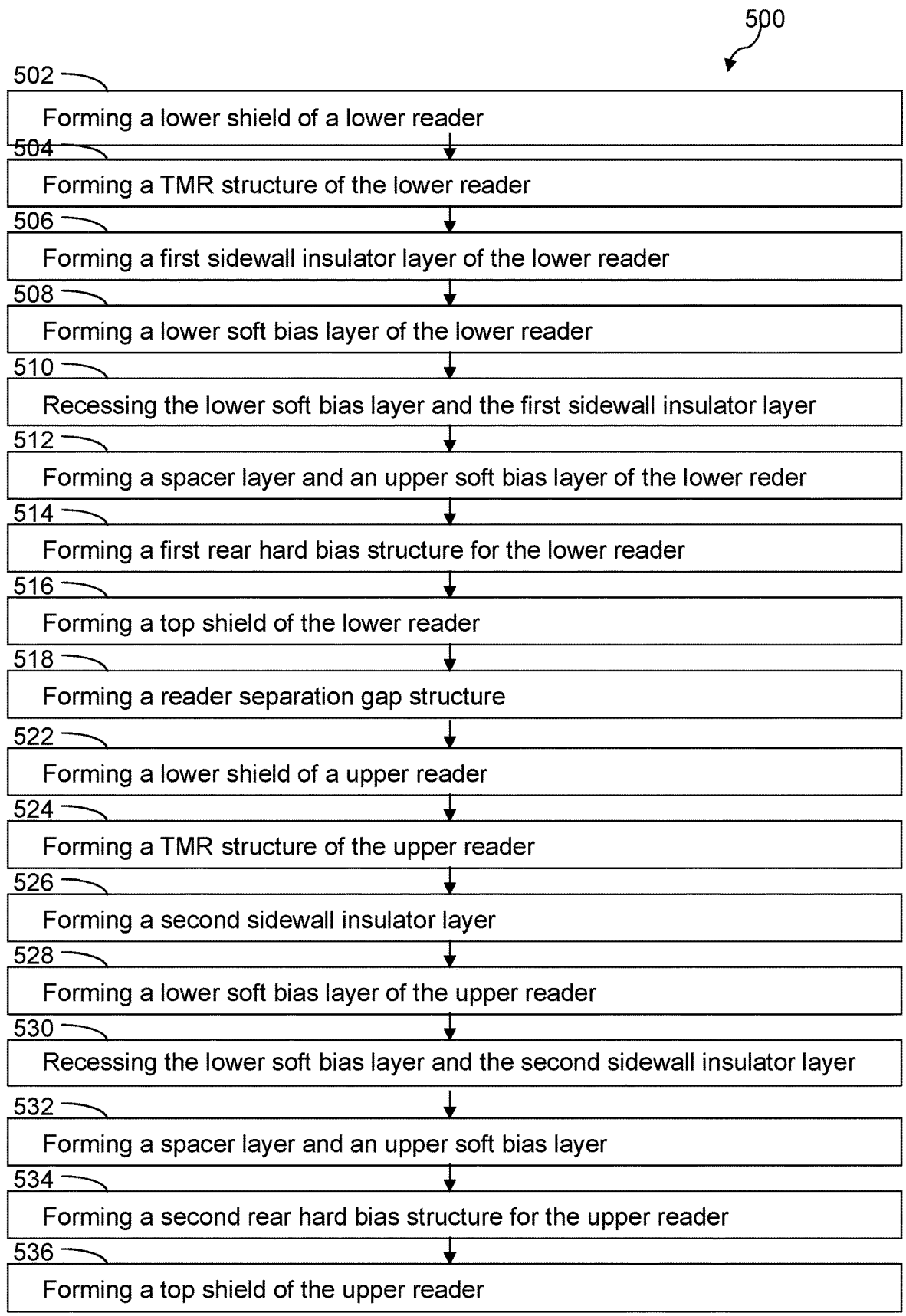
FIG. 5 is a flowchart illustrating a method of making a TDMR read head according to embodiments of the present disclosure.

FIG. 5 is a flowchart illustrating a method 500 of making a TDMR read head, according to one embodiment. The method 500 will be described concurrently with the schematic illustrations of a TDMR read head 600 at various stages of manufacture of FIGS. 6A-6H. Aspects of FIGS. 6A-6H may be similar to the components previously described above.

Figure 6A:
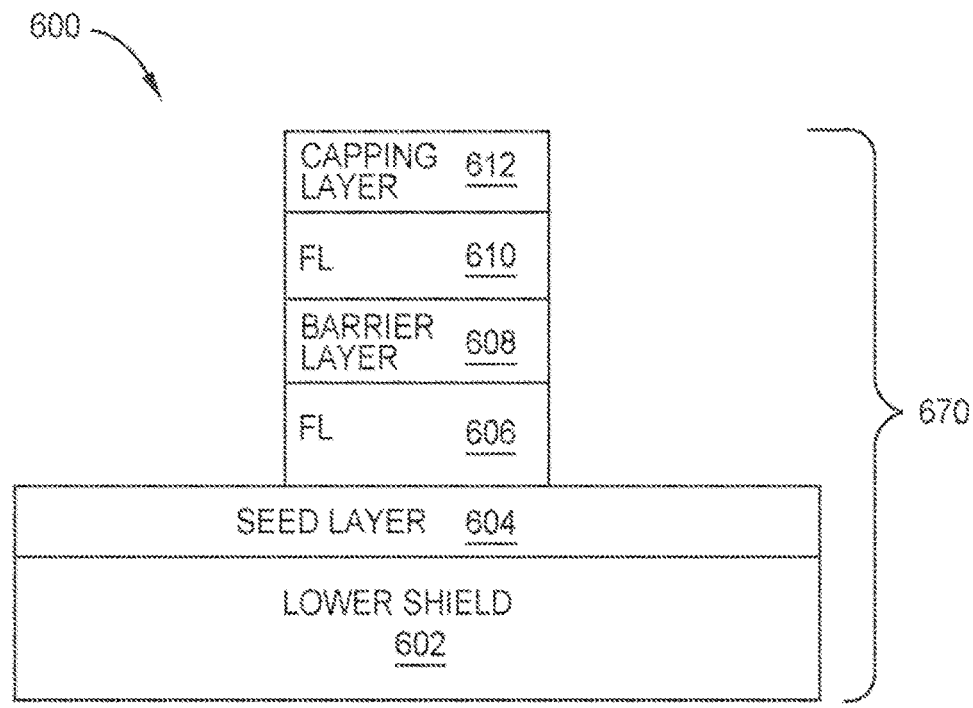
FIGS. 6A-6H are schematic sequential cross-sectional views of a TDMR read head during a manufacture process according to embodiments of the present disclosure.

In FIG. 6A, the lower shield 602, such as the S1 402 of the first reader of FIG. 4A, of the lower reader 670 is formed at block 502 of FIG. 5. The TMR structure is formed on the lower shield 602 of the lower reader 670 at block 504 of FIG. 5. The TMR structure includes the MTJ stack that includes the seed layer 604, the first free layer 606, the barrier layer 608, the second free layer 610, and the capping layer 612. Magnetic annealing of the TMR structure may or may not be required after the TMR structure deposition. The MTJ stack constitutes a first sensor (606, 608, 610, 612).

Figure 6B:
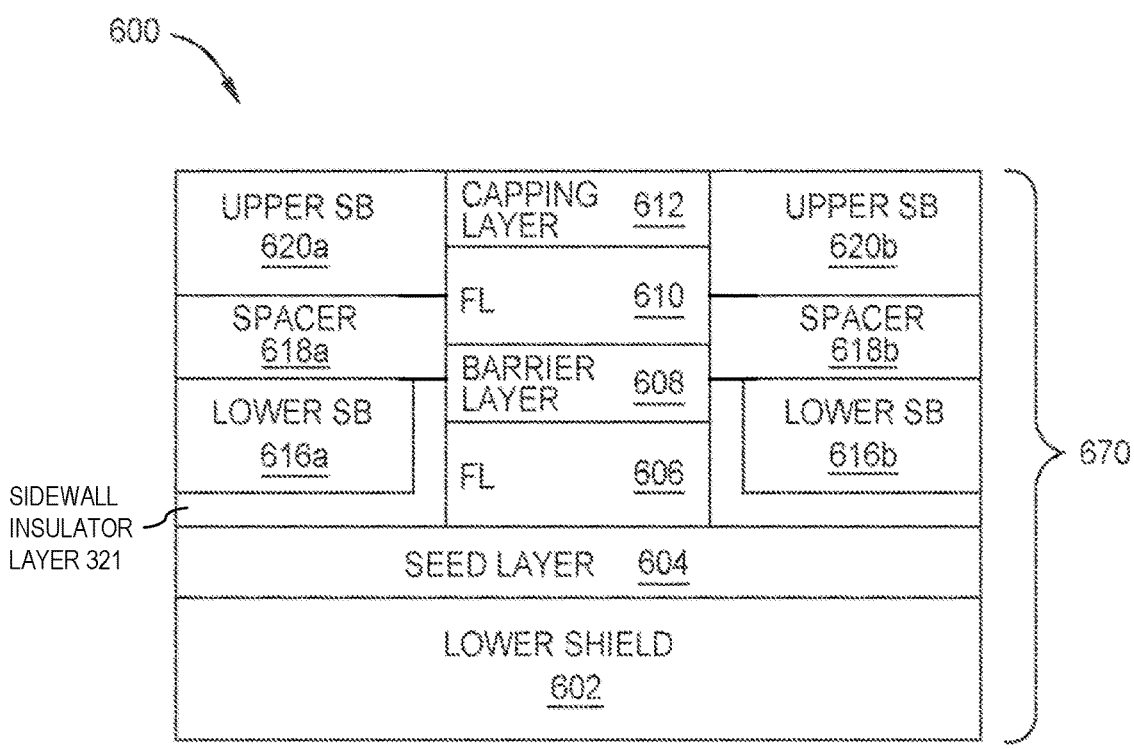

In FIG. 6B, the processing steps described with reference to FIGS. 2B and 2C, FIGS. 2B and 2E, or FIGS. 2B and 2G, may be performed to provide a structure described with reference to FIG. 2C, 2E, or 2G at blocks 506, 508, and 510 of FIG. 5. Specifically, the first sidewall insulating layer 321 can be formed with dual sidewall recessing (i.e., removal) illustrated in FIG. 2C, with a single sidewall recessing illustrated in FIG. 2E, or with thinning illustrated in FIG. 2G. First spacer layers (618a, 618b) and first upper soft bias (SB) layers (620a, 620b) can be formed at block 512. The SAF SB structures, such as the first lower soft bias (SB) layer 616a, the first spacer 618a, the first upper soft bias (SB) layer 620a, the second lower soft bias (SB) layer 616b, the second spacer 618b, and the second upper soft bias (SB) layer 620b, of the lower reader 670 are formed. At blocks 504-512, the processing steps may include mask layer deposition and photo printing, RIE etching to form carbon hard mask (CHM) stencil, ion milling to define lower MTJ, junction insulation by atomic layer deposition (ALD) or ion beam deposition (IBD), SB deposition, side wall mill open, resist strip, and chemical mechanical polishing (CMP).

Figure 6C:
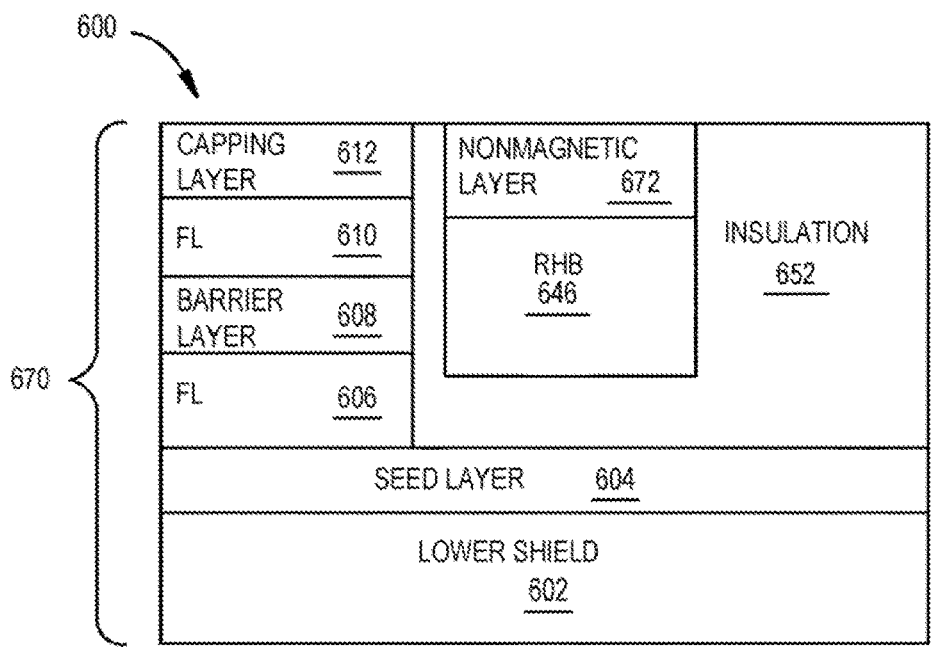

In FIG. 6C, the RHB structure 646 is formed for the lower reader 670 through a process of RHB deposition at block 514 and a nonmagnetic layer 672 is formed thereon. At block 514, the lower reader 670 is backfilled with junction insulation 652 (insulation 652). The process at block 514 may also include photo printing, RIE etching, ion milling to define lower MTJ back edge, and junction insulation 652 by ALD or IBD. The junction insulation 652 may be an AlOx deposition. The RHB 646 in one embodiment includes seed layers such as Ta and W, a permanent magnet (e.g., CoPt), and a nonmagnetic capping layer (e.g., Ta). In order to prevent the magnet from corrosion during CMP and to generate topography that limits TDMR down track spacing (DTS) and lead resistance, a glancing angle milling is applied to flatten the RHB 646. The DTS is the spacing between the first free layer 606 of the lower reader 670 and the first free layer 630 of the upper reader 680. After the capping layer 612 deposition (e.g., a Ta cap), a second glancing angle milling is applied to the MTJ stack to further flatten the RHB 646. After the milling occurs, the resist strip and CMP is applied to achieve device surface planarization. Furthermore, the electric lapping guide (ELG) may be formed during the steps outlined in block 512 and block 514.

Figure 6D:
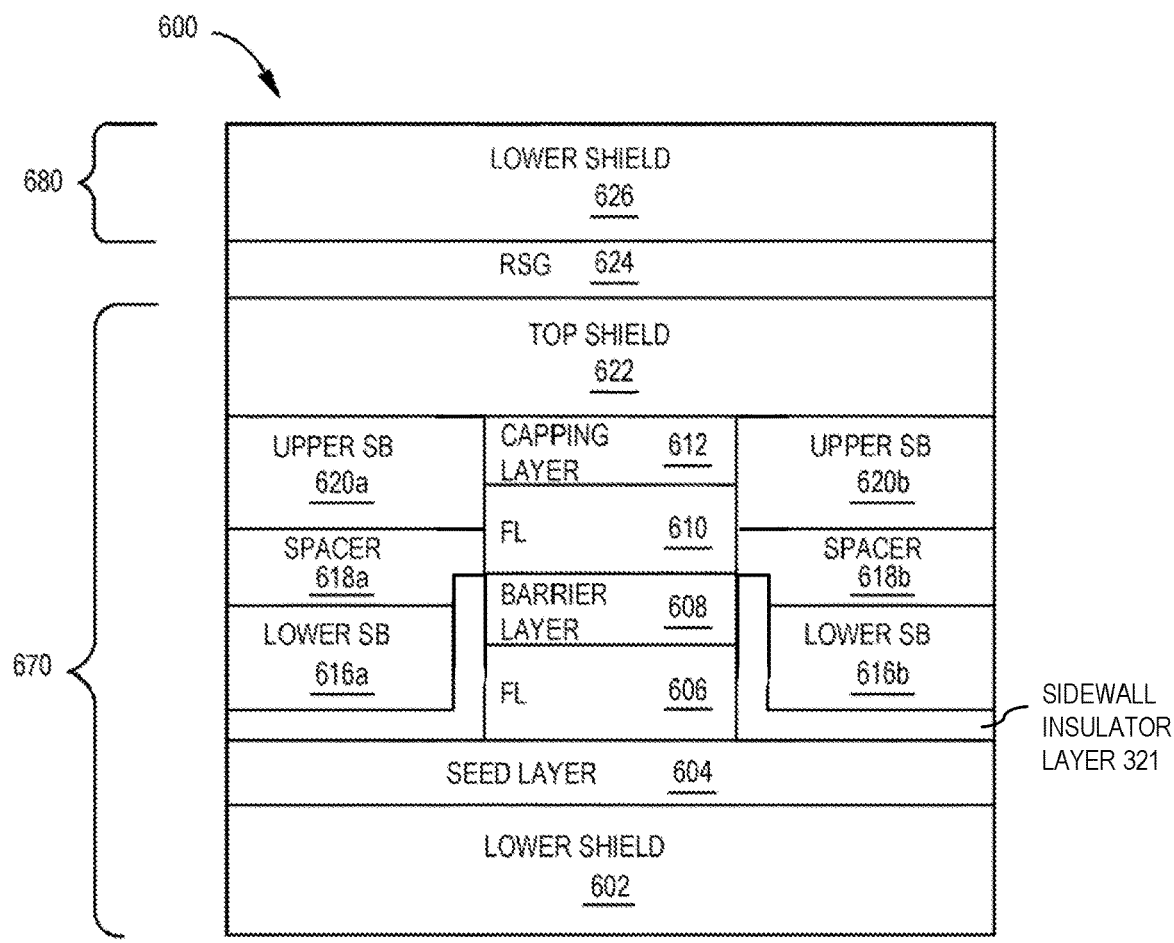

In FIG. 6D, the top shield 622, such as the second shield 422 of FIG. 4A, of the lower reader 670 is formed at block 516. At block 518, the RSG 624 is formed by the deposition of AlOx on the top shield 622 of the lower reader 670. The RSG 624 may be formed by photo printing, ion milling, metal refill, or lift-off. At block 522, the lower shield 626 of the upper reader 680 is formed on the RSG 624.

Figure 6E:
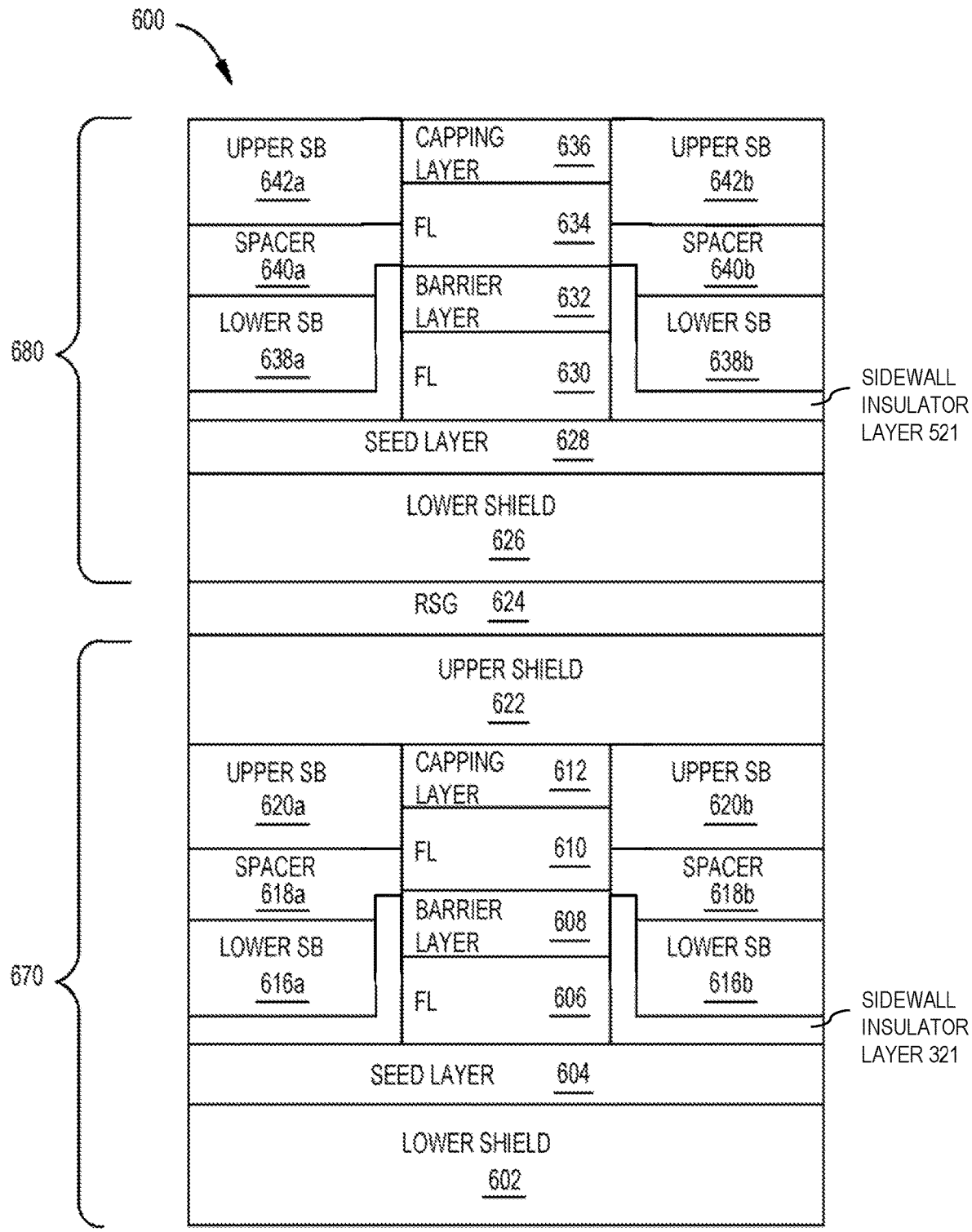

In FIG. 6E, the TMR structure is formed on the lower shield 626 of the upper reader 680 at block 524. The TMR structure includes the MTJ stack that includes the seed layer 628, the first free layer 630, the barrier layer 632, the second free layer 634, and the capping layer 636. Magnetic annealing is applied to the TMR structure after the TMR structure deposition. The MTJ stack constitutes a second sensor (630, 632, 634, 636).

The processing steps described with reference to FIGS. 2B and 2C, FIGS. 2B and 2E, or FIGS. 2B and 2G, may be performed again to provide a structure described with reference to FIG. 2C, 2E, or 2G at blocks 526, 528, and 530 of FIG. 5. Specifically, a second sidewall insulating layer 521 (which is equivalent to a sidewall insulating layer 321 illustrated in FIG. 2C, 2E, or 2G) can be formed with dual sidewall recessing illustrated in FIG. 2C, with a single sidewall recessing illustrated in FIG. 2E, or with thinning as illustrated in FIG. 2G. Second spacer layers (640a, 640b) and second upper soft bias (SB) layers (642a, 642b) can be formed at block 532.

The SAF SB structure structures, such as the first lower soft bias (SB) layer 638a, the first spacer 640a, the first upper soft bias (SB) layer 642a, the second lower soft bias (SB) layer 638b, the second spacer 640b, and the second upper soft bias (SB) layer 642b, of the upper DFL reader 680 are formed at block 532. At block 530 and block 532, the processing steps may include mask layer deposition and photo printing, RIE etching to form carbon hard mask (CHM) stencil, ion milling to define lower MTJ, junction insulation by atomic layer deposition (ALD) or ion beam deposition (IBD), SB deposition, side wall mill open, resist strip, and CMP.

Figure 6F:
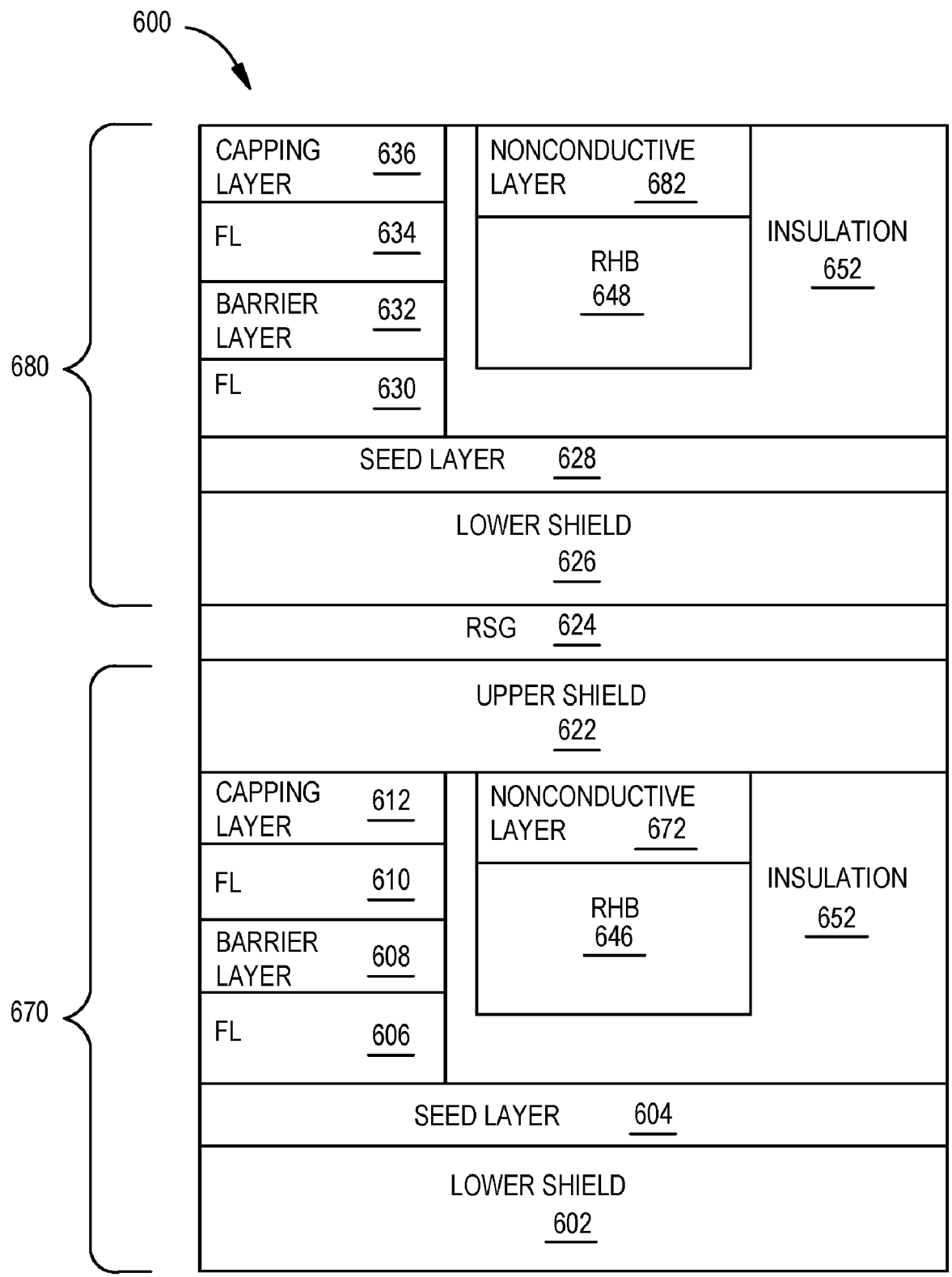

In FIG. 6F, the RHB 648 is formed for the upper reader 680 at block 534 and a nonmagnetic layer 682 is formed thereon. At block 534, the upper reader 680 is backfilled with junction insulation 652 (insulation 652). The processing steps at block 534 may also include photo printing, RIE etching, ion milling to define lower MTJ back edge, and junction insulation 652 by ALD or IBD. Furthermore, the gaps between each layer may be filled with dielectric materials that involve photo printing, AlOx deposition, and lift-off. The junction insulation 652 may be an AlOx deposition. The RHB 648, in one embodiment, includes seed layers such as Ta and W, a permanent magnet (e.g., CoPt), and a nonmagnetic capping layer (e.g., Ta). In order to prevent the magnet from corrosion during CMP and to generate topography that limits TDMR down track spacing (DTS) and lead resistance, a glancing angle milling is applied to flatten the RHB 648. The DTS is the spacing between the first free layer 606 of the lower reader 670 and the first free layer 630 of the upper reader 680. After the capping layer 636 deposition, a second glancing angle milling is applied to the MTJ stack to further flatten the RHB 648. After the milling occurs, the resist strip and CMP is applied to achieve device surface planarization. Furthermore, the electric lapping guide (ELG) may be formed during the steps outlined in block 522 and block 524. The milling depth of the upper reader 680 and the lower reader 670 determines the DTS and the lead resistance for the DFL TDMR read head 600.

Figure 6G:
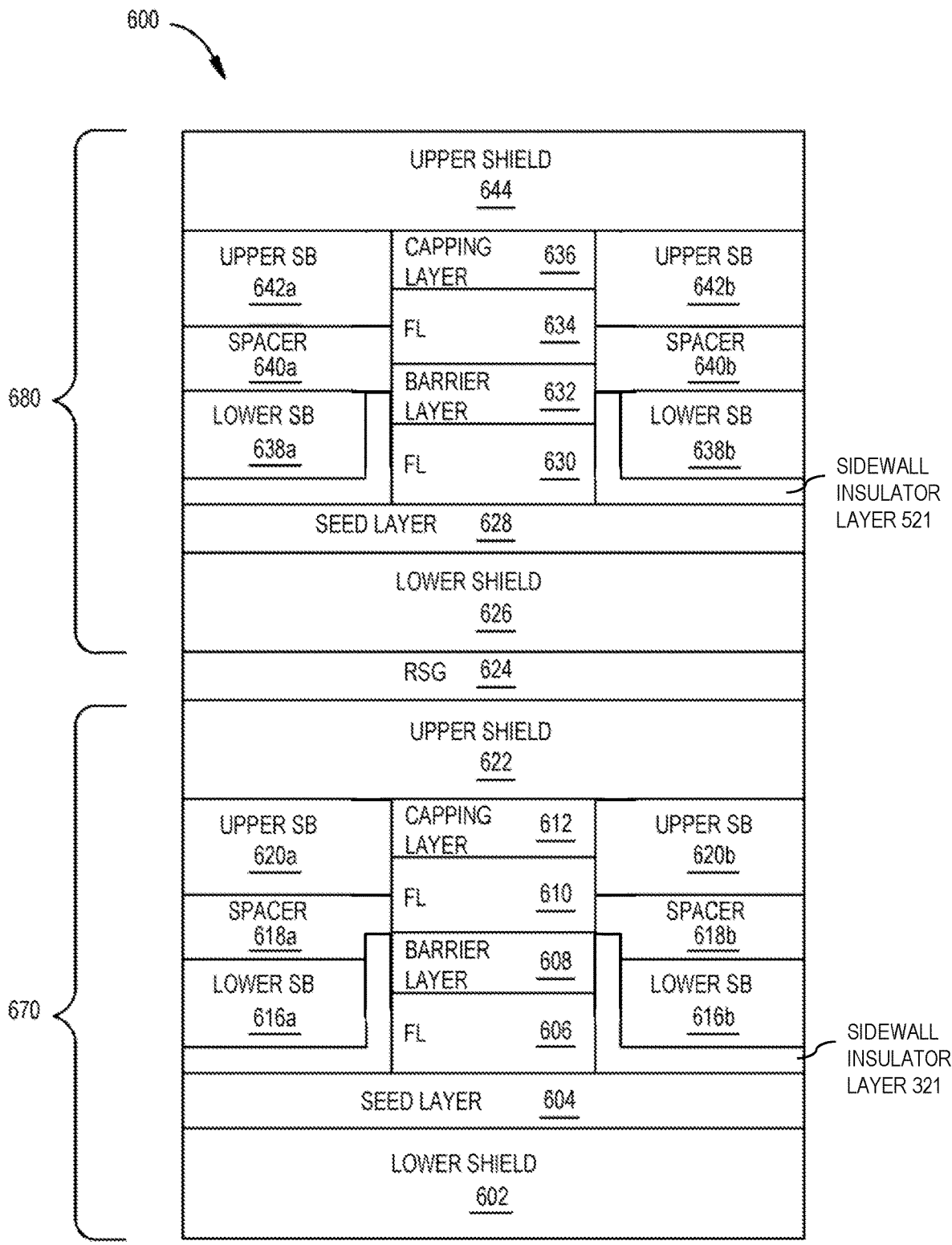
Figure 6H:
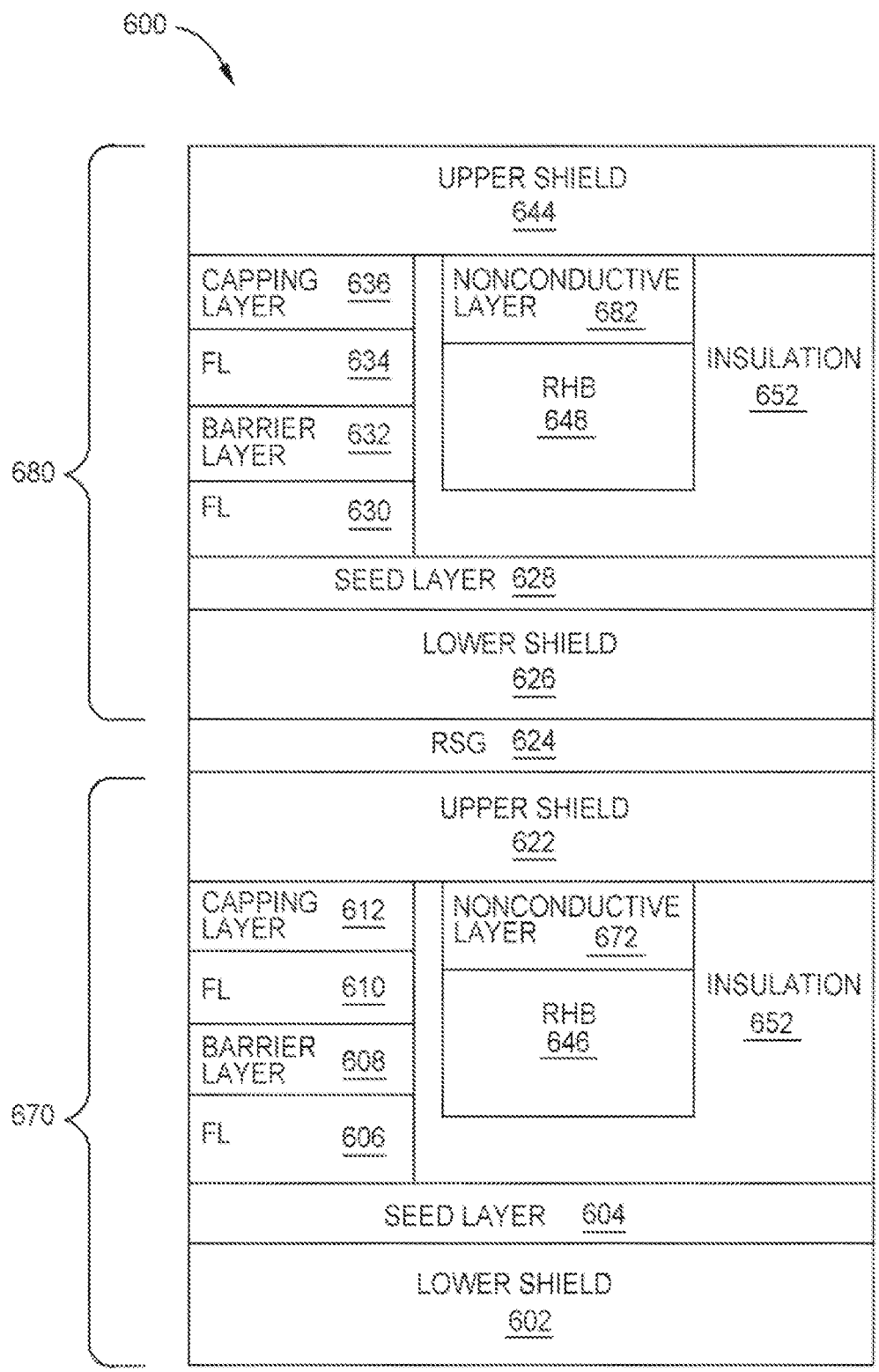

In FIGS. 6G and 6H, at block 536, the top shield 644 of the upper reader 680 is formed on the MTJ stack of the upper reader 680. The top shield 644 may be formed through deposition of the top shield materials, photo printing, nickel iron (NiFe) plating, resist strip, and ion milling. In the DFL TDMR read head 600, the lower reader 670 SB layers and the upper reader 680 SB layers are antiparallel biased, such that when the respective RHB 646, 648 exerts a magnetic field on the MTJ structure of the lower reader 670 and the upper reader 680, the respective magnetic moments tilt to form a "scissor" state. Furthermore, the DFL TDMR read head 600 does not have an antiferromagnetic (AFM) layer to anchor the pinned layer (PL) to the seed layer of each MTJ stack, which may result in a thinner stack thickness and a lower performance degradation of the MTJ.

Figure 7:
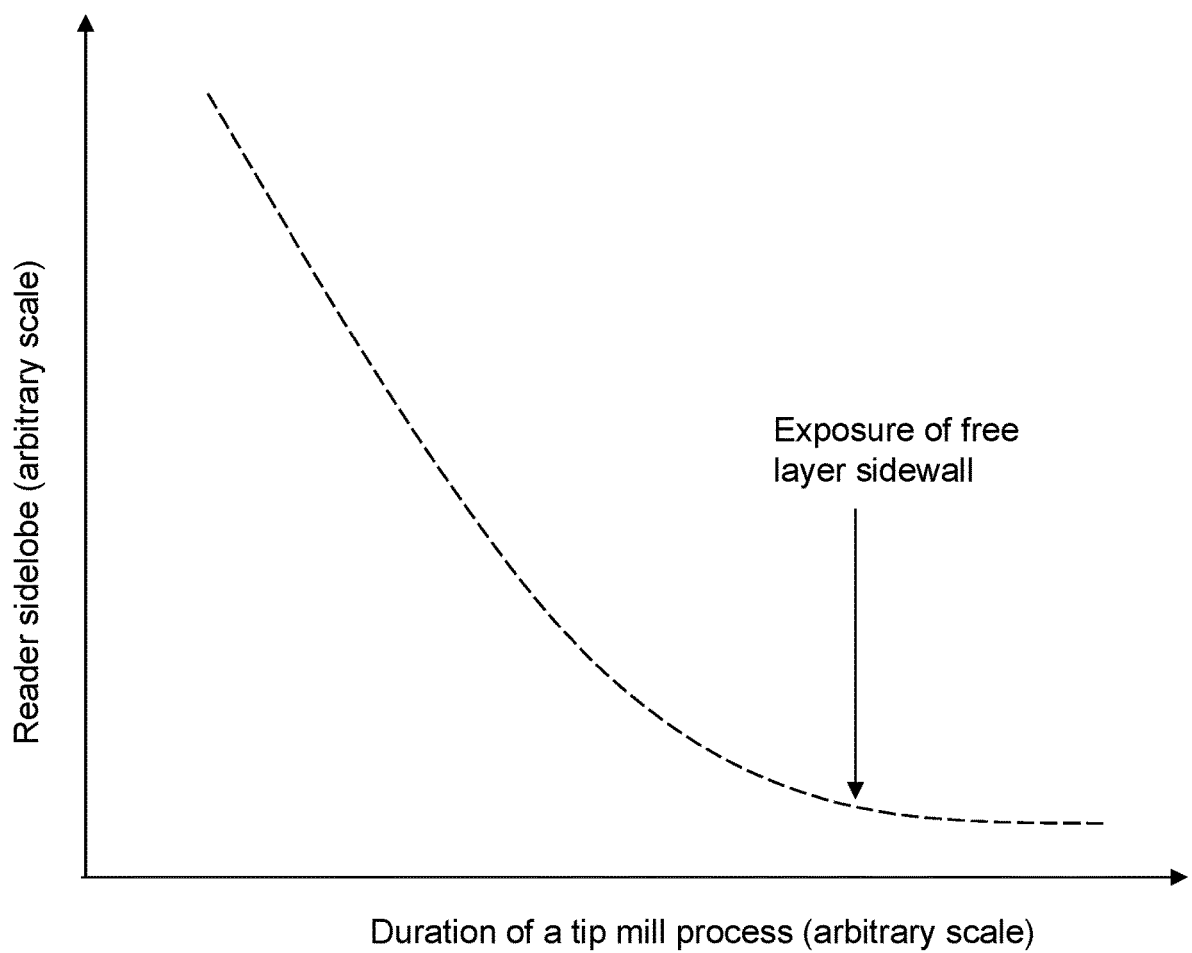
FIG. 7 is a graph illustrating the dependence of reader sidelobe as a function of a duration of tip mill process that is employed to recess a sidewall insulating layer according to an embodiment of the present disclosure.

FIG. 7 is a graph illustrating the dependence of reader sidelobe as a function of a duration of tip mill process that is employed to recess a sidewall insulating layer (321, 521) according to an embodiment of the present disclosure. The greater the duration of the tip mill process, the less the thickness of remaining vertical portions of a sidewall insulating layer (321, 521). The lesser the sidelobe, the greater the noise immunity of a TDMR head at low frequency. FIG. 7 shows that elimination of remaining vertical portions of a sidewall insulating layer (321, 521) or reduction in thickness of the physically exposed regions of the remaining vertical portions of a sidewall insulating layer (321, 521) reduces reader sidelobe, and thus, increase noise immunity of a TDMR head.

By using a dual free layer MTJ with SAF soft bias structures on the sides and a hard bias structure on the back, and by recessing an upper portion of at least one vertically-extending portion of at least one sidewall insulating layer (321, 521), a TDMR head with improved reliability and area density capacity (ADC) is realized without significant performance degradation.

Referring to all drawings and according to various embodiments of the present disclosure, a two-dimensional magnetic recording (TDMR) head is provided. The TDMR head comprises a first reader 670 and a second reader 680. The first reader 670 comprises: a first lower shield (402, 602, 302) having a first width at a media facing surface; a first seed layer (404, 604, 304) located in contact with the first lower shield (402, 602, 302), the first seed layer (404, 604, 304) having the first width at the media facing surface; a first dual free layer (DFL) sensor {(406, 408, 410, 412), (606, 608, 610, 612), (306, 308, 310, 312)} located over the first lower shield (402, 602, 302) and comprising a first free layer (406, 606, 306) and a second free layer (410, 610, 310), the first free layer (406, 606, 306) being in contact with the first seed layer (404, 604, 304); a first upper shield layer (422, 622) located over and in contact with the first DFL sensor {(406, 408, 410, 412), (606, 608, 610, 612), (306, 308, 310, 312)}, the first upper shield layer (422, 622) being a single layer; at least one first synthetic antiferromagnetic (SAF) structure {(416a, 418a, 420a, 416b, 418b, 420b), (616a, 618a, 620a, 616b, 618b, 620b), (316a, 318a, 320a, 316b, 318b, 320b)} located adjacent to the first DFL sensor {(406, 408, 410, 412), (606, 608, 610, 612), (306, 308, 310, 312)}, the at least one first (SAF) structure {(416a, 418a, 420a, 416b, 418b, 420b), (616a, 618a, 620a, 616b, 618b, 620b), (316a, 318a, 320a, 316b, 318b, 320b)} comprising a first lower soft bias layer (416a, 416b, 616a, 616b, 316a, or 316b), a first spacer layer (418a, 418b, 618a, 618b, 318a, or 318b) located on the first lower soft bias layer (416a, 416b, 616a, 616b, 316a, or 316b), and a first upper soft bias layer (420a, 420b, 620a, 620b, 320a, or 320b) located on the first spacer layer (418a, 418b, 618a, 618b, 318a, or 318b) and in contact with the first upper shield layer (422, 622); and a first sidewall insulating layer 321 comprising a horizontally-extending portion located between the first seed layer (404, 604, 304) and the first lower soft bias layer (416a, 416b, 616a, 616b, 316a, or 316b) and a vertically-extending portion located between the first lower soft bias layer (416a, 416b, 616a, 616b, 316a, or 316b) and the first free layer (406, 606, 306), wherein the first upper shield layer (422, 622) is in direct contact with a sidewall of the second free layer (410, 610, 310), and the second reader 680 located over the first reader 670.

In one embodiment, the first spacer layer (418a, 418b, 618a, 618b, 318a, or 318b) is in direct contact with the sidewall of the second free layer (410, 610, 310). In one embodiment, the first DFL sensor {(406, 408, 410, 412), (606, 608, 610, 612), (306, 308, 310, 312)} comprises: the first free layer (406, 606, 306); a first barrier layer (408, 608. 308) located over the first free layer (406, 606, 306); the second free layer (410, 610, 310) located over the first barrier layer (408, 608. 308); and a first capping layer (412, 612, 312) located over the second free layer (410, 610, 310). In one embodiment, the first spacer layer (418a, 418b, 618a, 618b, 318a, or 318b) is in direct contact with a sidewall of the first barrier layer (408, 608. 308). In one embodiment, the first lower soft bias layer (416a, 416b, 616a, 616b, 316a, or 316b) is not in direct contact with the first free layer (406, 606, 306) and is not in contact with the first barrier layer (408, 608. 308); and the first upper soft bias layer (420a, 420b, 620a, 620b, 320a, or 320b) is in direct contact with the first capping layer (412, 612, 312).

In one embodiment, the TDMR head further comprises an insulating reader separation gap RSG (424, 624) located between the first reader 670 and the second reader 680, the insulating reader separation gap RSG (424, 624) being in contact with the first upper shield layer (422, 622). In one embodiment, the second reader 680 comprises: a second lower shield (426, 626, 302), the second lower shield (426, 626, 302) being a single layer and having the first width at the media facing surface; a second seed layer (428, 628, 304) located in contact with the second lower shield (426, 626, 302), the second seed layer (428, 628, 304) having the first width at the media facing surface; a second DFL sensor {(430, 432, 434, 436), (630, 632, 634, 636), (306, 308, 310, 312)} located over the second lower shield (426, 626, 302), the second DFL sensor {(430, 432, 434, 436), (630, 632, 634, 636), (306, 308, 310, 312)} being aligned with the first DFL sensor {(406, 408, 410, 412), (606, 608, 610, 612), (306, 308, 310, 312)} at an air bearing surface and comprising a third free layer (430, 630, 306) and a third free layer (434, 634, 310), the third free layer (430, 630, 306) being in contact with the second seed layer (428, 628, 304); and a second upper shield layer (444, 644, 322) located over the second DFL sensor {(430, 432, 434, 436), (630, 632, 634, 636), (306, 308, 310, 312)}.

In one embodiment, the second reader 680 comprises at least one second synthetic antiferromagnetic (SAF) structure {(438a, 440a, 442a, 438b, 440b, 442b), (638a, 640a, 642a, 638b, 640b, 642b), (316a, 318a, 320a, 316b, 318b, 320b)} located adjacent to the second DFL sensor {(430, 432, 434, 436), (630, 632, 634, 636), (306, 308, 310, 312)}, the at least one second (SAF) structure {(438a, 440a, 442a, 438b, 440b, 442b), (638a, 640a, 642a, 638b, 640b, 642b), (316a, 318a, 320a, 316b, 318b, 320b)} comprising a second lower soft bias layer (438a, 438b, 638a, 638b, 316a, or 316b), a second spacer layer (440a, 440b, 640a, 640b, 318a, or 318b) located on the second lower soft bias layer (438a, 438b, 638a, 638b, 316a, or 316b), and a second upper soft bias layer (440a, 440b, 640a, 640b, 320a, or 320b) located on the second spacer layer (440a, 440b, 640a, 640b, 318a, or 318b) and in contact with the second upper shield layer (444, 644, 322). In one embodiment, the second reader 680 comprises a second sidewall insulating layer 521 comprising a horizontally-extending portion located between the second seed layer (428, 628, 304) and the second lower soft bias layer (438a, 438b, 638a, 638b, 316a, or 316b) and a vertically-extending portion located between the second lower soft bias layer (438a, 438b, 638a, 638b, 316a, or 316b) and the third free layer (430, 630, 306), wherein the first upper shield layer (422, 622) is in direct contact with a sidewall of the third free layer (434, 634, 310). In one embodiment, the second spacer layer (440a, 440b, 640a, 640b, 318a, or 318b) is in direct contact with the sidewall of the third free layer (434, 634, 310).

In one embodiment, the second DFL sensor {(430, 432, 434, 436), (630, 632, 634, 636), (306, 308, 310, 312)} comprises: the third free layer (430, 630, 306); a second barrier layer (432, 632, 308) located over the third free layer (430, 630, 306); the third free layer (434, 634, 310) located over the second barrier layer (432, 632, 308); and a second capping layer (436, 636, 312) located over the third free layer (434, 634, 310).

In one embodiment, the second spacer layer (440a, 440b, 640a, 640b, 318a, or 318b) is in direct contact with a sidewall of the second barrier layer (432, 632, 308). In one embodiment, the second lower soft bias layer (438a, 438b, 638a, 638b, 316a, or 316b) is not in direct contact with the third free layer (430, 630, 306) and is not in contact with the second barrier layer (432, 632, 308); and the second upper soft bias layer (440a, 440b, 640a, 640b, 320a, or 320b) is in direct contact with the second capping layer (436, 636, 312). In one embodiment, the TDMR head further comprises a first rear hard bias structure (446, 646, 346) located behind the first DFL sensor {(406, 408, 410, 412), (606, 608, 610, 612), (306, 308, 310, 312)}.

According to another aspect of the present disclosure, a magnetic recording device comprising the TDMR head of the present disclosure is provided.

According to yet another aspect of the present disclosure, a two-dimensional magnetic recording (TDMR) head comprising a first reader 670 and a second reader 680 is provided. The first reader 670 comprises: a first lower shield (402, 602, 302) having a first width at a media facing surface; a first seed layer (404, 604, 304) located in contact with the first lower shield (402, 602, 302), the first seed layer (404, 604, 304) having the first width at the media facing surface; a first sensor {(406, 408, 410, 412), (606, 608, 610, 612), (306, 308, 310, 312)} located over the first lower shield (402, 602, 302) and comprising a first free layer (406, 606, 306) and a second free layer (410, 610, 310), the first free layer (406, 606, 306) of the first sensor {(406, 408, 410, 412), (606, 608, 610, 612), (306, 308, 310, 312)} contacting the first seed layer (404, 604, 304); a first upper shield layer (422, 622) located over and in contact with the first sensor {(406, 408, 410, 412), (606, 608, 610, 612), (306, 308, 310, 312)}; a first rear hard bias structure (446, 646, 346) located behind the first sensor {(406, 408, 410, 412), (606, 608, 610, 612), (306, 308, 310, 312)}; at least one first synthetic antiferromagnetic (SAF) structure {(416a, 418a, 420a, 416b, 418b, 420b), (616a, 618a, 620a, 616b, 618b, 620b), (316a, 318a, 320a, 316b, 318b, 320b)} located adjacent to the first sensor {(406, 408, 410, 412), (606, 608, 610, 612), (306, 308, 310, 312)} and comprising a first lower soft bias layer (416a, 416b, 616a, 616b, 316a, or 316b), a first spacer layer (418a, 418b, 618a, 618b, 318a, or 318b) located on the first lower soft bias layer (416a, 416b, 616a, 616b, 316a, or 316b), and a first upper soft bias layer (420a, 420b, 620a, 620b, 320a, or 320b) located on the first spacer layer (418a, 418b, 618a, 618b, 318a, or 318b) and in contact with the first upper shield layer (422, 622); and a first sidewall insulating layer 321 comprising a horizontally-extending portion located between the first seed layer (404, 604, 304) and the first lower soft bias layer (416a, 416b, 616a, 616b, 316a, or 316b) and a vertically-extending portion located between the first lower soft bias layer (416a, 416b, 616a, 616b, 316a, or 316b) and the first free layer (406, 606, 306), wherein the vertically extending portion has a first thickness t1 between the first lower soft bias layer (416a, 416b, 616a, 616b, 316a, or 316b) and the first free layer (406, 606, 306) and has a second thickness t2 that is less than the first thickness t1 between the first upper soft bias layer (420a, 420b, 620a, 620b, 320a, or 320b) and the second free layer (410, 610, 310), wherein the second reader 680 is located over the first reader 670.

In one embodiment, the first lower shield (402, 602, 302) has a first length from the media facing surface into the TDMR head; the first seed layer (404, 604, 304) has the first length from the media facing surface into the TDMR head; the second lower shield (426, 626, 302) has the first length from the media facing surface into the TDMR head; and the second seed layer (428, 628, 304) has the first length from the media facing surface into the TDMR head.

In one embodiment, the second thickness t2 is in a range from 10% to 90% of the first thickness t1. In one embodiment, the first DFL sensor {(406, 408, 410, 412), (606, 608, 610, 612), (306, 308, 310, 312)} comprises: the first free layer (406, 606, 306); a first barrier layer (408, 608. 308) located over the first free layer (406, 606, 306); the second free layer (410, 610, 310) located over the first barrier layer (408, 608. 308); and a first capping layer (412, 612, 312) located over the second free layer (410, 610, 310). In one embodiment, the first sidewall insulating layer 321 has the first thickness t1 below a horizontal plane including a top surface of the first lower soft bias layer (416a, 416b, 616a, 616b, 316a, or 316b) and has the second thickness t2 above the horizontal plane.

The various embodiment of the present disclosure may be employed to provide a two-dimensional magnetic recording (TDMR) head in which at least one recessed or thinned sidewall insulating layer around a dual free layer sensor reduces reader sidelobe and increases noise immunity of the sensor at low frequencies.

It is to be understood that the magnetic recording head discussed herein is applicable to a data storage device such as a hard disk drive (HDD) as well as a tape drive, such as a tape embedded drive (TED) or an insertable tape media drive. An example TED is described in patent application entitled "Head Assembly with Suspension System for a Tape Embedded Drive", U.S. patent application Ser. No. 16/365,034, filed Mar. 26, 2019 and incorporated herein by reference in its entirely. Any reference in the detailed description to a HDD or tape drive is merely for exemplification purposes and is not intended to limit the disclosure unless explicitly claimed. Furthermore, reference to or claims directed to magnetic recording devices are intended to include both HDD and tape drive unless HDD or tape drive devices are explicitly claimed.

Although the foregoing refers to particular preferred embodiments, it will be understood that the disclosure is not so limited. It will occur to those of ordinary skill in the art that various modifications may be made to the disclosed embodiments and that such modifications are intended to be within the scope of the disclosure. Compatibility is presumed among all embodiments that are not alternatives of one another. The word "comprise" or "include" contemplates all embodiments in which the word "consist essentially of" or the word "consists of" replaces the word "comprise" or "include," unless explicitly stated otherwise. Whenever two or more elements are listed as alternatives in a same paragraph of in different paragraphs, a Markush group including a listing of the two or more elements is also impliedly disclosed. Whenever the auxiliary verb "can" is employed in this disclosure to describe formation of an element or performance of a processing step, an embodiment in which such an element or such a processing step is not performed is also expressly contemplated, provided that the resulting apparatus or device can provide an equivalent result. As such, the auxiliary verb "can" as applied to formation of an element or performance of a processing step should also be interpreted as "may" or as "may, or may not" whenever omission of formation of such an element or such a processing step is capable of providing the same result or equivalent results, the equivalent results including somewhat superior results and somewhat inferior results. Where an embodiment employing a particular structure and/or configuration is illustrated in the present disclosure, it is understood that the present disclosure may be practiced with any other compatible structures and/or configurations that are functionally equivalent provided that such substitutions are not explicitly forbidden or otherwise known to be impossible to one of ordinary skill in the art. If publications, patent applications, and/or patents are cited herein, each of such documents is incorporated herein by reference in their entirety.

What is claimed is:

1. A magnetic recording head comprising a first reader, wherein the first reader comprises:
   a first lower shield;
   a first dual free layer (DFL) sensor located over the first lower shield and comprising a first free layer, a second free layer and a first barrier layer located between the first free layer and the second free layer;
   a first upper shield located over the first DFL sensor;
   a first synthetic antiferromagnetic (SAF) structure located adjacent to a first side of the first DFL sensor, the first SAF structure comprising a first lower soft bias layer, a first upper soft bias layer, and a first spacer layer located between the first lower soft bias layer and the first upper soft bias layer; and
   a first sidewall insulating layer comprising a first portion having a first thickness located between the first lower soft bias layer and the first free layer, wherein:
   the first upper soft bias layer is in direct contact with a first sidewall of the second free layer; or
   a second portion of the first sidewall insulating layer having a second thickness less than the first thickness is located between the first sidewall of the first upper soft bias layer and the second free layer.

2. The magnetic recording head of claim 1, wherein the first reader further comprises a first rear hard bias structure located behind the first DFL sensor.

3. The magnetic recording head of claim 1, wherein the first upper soft bias layer is in direct contact with the first sidewall of the second free layer.

4. The magnetic recording head of claim 3, wherein the first spacer layer is in direct contact with the first sidewall of the second free layer.

5. The magnetic recording head of claim 4, wherein the first spacer layer is in direct contact with a first sidewall of the first barrier layer.

6. The magnetic recording head of claim 3, wherein:
   the first lower soft bias layer is not in direct contact with and is laterally separated from the first free layer by the first portion of the first sidewall insulating layer; and
   the first lower soft bias layer is not in direct contact with and is laterally separated from the first barrier layer by the first portion of the first sidewall insulating layer.

7. The magnetic recording head of claim 1, wherein:
   the first DFL sensor further comprises a capping layer located over the second free layer; and
   the first upper soft bias layer is in direct contact with the capping layer.

8. The magnetic recording head of claim 1, wherein the first reader further comprises:
   a second synthetic antiferromagnetic (SAF) structure located adjacent to a second side of the first DFL sensor, the second SAF structure comprising a second lower soft bias layer, a second upper soft bias layer; and a second spacer layer located between the second lower soft bias layer and the second upper soft bias layer; and
   a second sidewall insulating layer comprising a first portion having the first thickness located between the second lower soft bias layer and a second sidewall of the first free layer.

9. The magnetic recording head of claim 8, wherein a second portion of the second sidewall insulating layer having the first thickness is located between the second upper soft bias layer and a second sidewall of the second free layer.

10. The magnetic recording head of claim 8, wherein the second upper soft bias layer is in direct contact with a second sidewall of the second free layer.

11. The magnetic recording head of claim 8, wherein a second portion of the second sidewall insulating layer having a second thickness less than the first thickness is located between the second upper soft bias layer and a second sidewall of the second free layer.

12. The magnetic recording head of claim 1, wherein the second portion of the first sidewall insulating layer having the second thickness less than the first thickness is located between the first sidewall of the first upper soft bias layer and the second free layer.

13. The magnetic recording head of claim 1, further comprising a second reader and an insulating reader separation gap located between the first reader and the second reader, wherein the magnetic recording head comprises a two-dimensional magnetic recording (TDMR) head.

14. The magnetic recording head of claim 13, wherein the second reader comprises:
   a second lower shield;
   a second DFL sensor located over the second lower shield, the second DFL sensor being aligned with the first DFL sensor at an air bearing surface and comprising a third free layer, a fourth free layer, and a second barrier layer located between the third free layer and the fourth free layer;
   a second upper shield layer located over the second DFL sensor;
   a third synthetic antiferromagnetic (SAF) structure located adjacent to a first side of the second DFL sensor, the third SAF structure comprising a third lower soft bias layer, a third upper soft bias layer; and a third spacer layer located between the third lower soft bias layer and the third upper soft bias layer; and
   a third sidewall insulating layer comprising a first portion having a first thickness located between the third lower soft bias layer and the third free layer.

15. The magnetic recording head of claim 14, wherein the third upper soft bias layer is in direct contact with a first sidewall of the fourth free layer.

16. The magnetic recording head of claim 14, wherein a second portion of the third sidewall insulating layer having a fourth second thickness less than the first thickness is located between the first sidewall of the third upper soft bias layer and the fourth free layer.

17. A magnetic recording device comprising the magnetic recording head of claim 1.

* * * * *